United States Patent
Widmer et al.

(10) Patent No.: US 9,656,564 B2
(45) Date of Patent: *May 23, 2017

(54) ADAPTIVE WIRELESS ENERGY TRANSFER SYSTEM

(71) Applicant: QUALCOMM Incorporated, San Diego, CA (US)

(72) Inventors: Hanspeter Widmer, Wohlenschwill (CH); Nigel Cook, El Cajon, CA (US); Lukas Sieber, Olten (CH)

(73) Assignee: QUALCOMM Incorporated, San Diego, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 14/537,767

(22) Filed: Nov. 10, 2014

(65) Prior Publication Data

US 2015/0061590 A1    Mar. 5, 2015

Related U.S. Application Data

(63) Continuation of application No. 13/110,874, filed on May 18, 2011, now Pat. No. 8,884,581.

(60) Provisional application No. 61/346,378, filed on May 19, 2010, provisional application No. 61/367,802, filed on Jul. 26, 2010.

(51) Int. Cl.
| | | |
|---|---|---|
| H02J 7/00 | (2006.01) | |
| B60L 11/18 | (2006.01) | |
| H01F 38/14 | (2006.01) | |
| H02J 7/02 | (2016.01) | |

(52) U.S. Cl.
CPC ......... *B60L 11/182* (2013.01); *B60L 11/1827* (2013.01); *B60L 11/1829* (2013.01); *B60L 11/1833* (2013.01); *H01F 38/14* (2013.01); *H02J 7/025* (2013.01); *B60L 2200/26* (2013.01); *Y02T 10/7005* (2013.01); *Y02T 10/7072* (2013.01); *Y02T 10/7088* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/168* (2013.01); *Y04S 30/12* (2013.01)

(58) Field of Classification Search
CPC ........ H02J 7/025; H01F 38/14; Y02T 90/122; B60L 11/182; Y02E 60/12
USPC ....................................... 320/108
See application file for complete search history.

(56) References Cited

U.S. PATENT DOCUMENTS

| | | | |
|---|---|---|---|
| 5,617,003 A | 4/1997 | Odachi et al. | |
| 5,821,731 A | 10/1998 | Kuki et al. | |
| 5,895,985 A * | 4/1999 | Fischer | H01H 9/54 307/114 |
| 7,660,133 B1 * | 2/2010 | Hwang | H02M 3/33592 363/16 |
| 2008/0259646 A1 | 10/2008 | Moussaoui | |
| 2009/0010028 A1 | 1/2009 | Baarman et al. | |
| 2009/0033280 A1 * | 2/2009 | Choi | H02J 7/025 320/108 |
| 2009/0079270 A1 | 3/2009 | Jin | |
| 2009/0243394 A1 | 10/2009 | Levine | |
| 2009/0271048 A1 | 10/2009 | Wakamatsu | |
| 2010/0084918 A1 | 4/2010 | Fells et al. | |
| 2010/0109443 A1 | 5/2010 | Cook et al. | |
| 2010/0109767 A1 * | 5/2010 | Midya | H03F 3/217 330/10 |
| 2010/0117596 A1 | 5/2010 | Cook et al. | |
| 2010/0256710 A1 | 10/2010 | Dinsmoor et al. | |
| 2011/0082612 A1 | 4/2011 | Ichikawa | |
| 2011/0199046 A1 * | 8/2011 | Tsai | H02J 7/025 320/108 |
| 2011/0285349 A1 | 11/2011 | Widmer et al. | |

FOREIGN PATENT DOCUMENTS

| | | |
|---|---|---|
| CN | 2762420 Y | 3/2006 |
| CN | 1826715 A | 8/2006 |
| CN | 1902779 A | 1/2007 |
| EP | 1022840 A2 | 7/2000 |
| JP | H08265992 A | 10/1996 |
| JP | H1014139 A | 1/1998 |
| JP | 2005124314 A | 5/2005 |
| JP | 2006074848 A | 3/2006 |
| JP | 2009081946 A | 4/2009 |
| JP | 2010504074 A | 2/2010 |
| JP | 3165768 U | 3/2011 |
| WO | WO-2008035248 A2 | 3/2008 |
| WO | WO-2009140217 A2 | 11/2009 |
| WO | WO-2010052785 A1 | 5/2010 |

OTHER PUBLICATIONS

International Search Report and Written Opinion—PCT/US2011/037058—ISA/EPO—Sep. 17, 2012.

* cited by examiner

*Primary Examiner* — Arun Williams

(74) *Attorney, Agent, or Firm* — Knobbe, Martens, Olson & Bear, LLP

(57) ABSTRACT

Exemplary embodiments are directed to wireless power transfer using magnetic resonance in a coupling mode region between a charging base (CB) and a remote system such as a battery electric vehicle (BEV). The wireless power transfer can occur from the CB to the remote system and from the remote system to the CB. Load adaptation and power control methods can be employed to adjust the amount of power transferred over the wireless power link, while maintaining transfer efficiency.

19 Claims, 23 Drawing Sheets ered by a vehicle, which may require chassis clear-

ADAPTIVE WIRELESS ENERGY TRANSFER SYSTEM

CLAIM OF PRIORITY UNDER 35 U.S.C. §119

This application is a continuation of U.S. patent application Ser. No. 13/110,874, filed on May 18, 2011. U.S. patent application Ser. No. 13/110,874 claims the benefit of U.S. Provisional Patent Application 61/346,378 entitled "ADAPTIVE WIRELESS ENERGY TRANSFER SYSTEM" filed on May 19, 2010, and claims the benefit of U.S. Provisional Patent Application 61/367,802 entitled "ADAPTIVE WIRELESS ENERGY TRANSFER SYSTEM" filed on Jul. 26, 2010. Each of these applications is hereby expressly incorporated by reference in its entirety.

BACKGROUND

Field

The present invention relates generally to wireless power transfer, and more specifically to devices, systems, and methods related to wireless power transfer to remote systems such as vehicles including batteries.

Background

Approaches are being developed that use over-the-air or wireless power transmission between a transmitter and a receiver coupled to the electronic device to be charged. Such approaches generally fall into two categories. One is based on the coupling of plane wave radiation (also called far-field radiation) between a transmit antenna and a receive antenna on the device to be charged. The receive antenna collects and rectifies the radiated power for charging the battery. This approach suffers from the fact that the power coupling falls off quickly with distance between the antennas, so charging over reasonable distances (e.g., less than 1 to 2 meters) becomes difficult. Additionally, since the transmitting system radiates plane waves, unintentional radiation can interfere with other systems if not properly controlled through filtering.

Other approaches to wireless energy transmission techniques are based on inductive coupling between a transmit antenna embedded, for example, in a "charging" mat or surface and a receive antenna (plus a rectifying circuit) embedded in the electronic device to be charged. This approach has the disadvantage that the spacing between transmit and receive antennas must be very close (e.g., within millimeters). Though this approach does have the capability to simultaneously charge multiple devices in the same area, this area is typically very small and requires the user to accurately locate the devices to a specific area.

Recently, remote systems such as vehicles have been introduced that include locomotion power from electricity and batteries to provide that electricity. Hybrid electric vehicles include on-board chargers that use power from vehicle braking and traditional motors to charge the vehicles. Vehicles that are solely electric must receive the electricity for charging the batteries from other sources. These electric vehicles are conventionally proposed to be charged through some type of wired alternating current (AC) such as household or commercial AC supply sources.

Efficiency is of importance in a wireless power transfer system due to the losses occurring in the course of wireless transmission of power. Since wireless power transmission is often less efficient than wired transfer, efficiency is of an even greater concern in a wireless power transfer environment. As a result, there is a need for methods and apparatuses that provide wireless power to electric vehicles.

A wireless charging system for electric vehicles may require transmit and receive antennas to be aligned within a certain degree. Differences in distance and alignment of transmit and receive antennas impacts efficient transmission. Therefore, a need exists for adapting link parameters in a wireless power transfer system in order to improve power transfer, efficiency, and regulatory compliance.

SUMMARY

Exemplary embodiments are directed to wireless power transfer using magnetic resonance in a coupling mode region between a charging base (CB) and a remote system such as a battery electric vehicle (BEV). The wireless power transfer can occur from the CB to the remote system and from the remote system to the CB. Load adaptation and power control methods can be employed to adjust the amount of power transferred over the wireless power link, while maintaining transfer efficiency. In one or more exemplary embodiments, an adaptable power converter is configurable between at least first and second modes to convert power from and to a power supply system at an operating frequency in a transmit mode and vice versa in a receive mode. A charging base antenna is configured for resonance near the operating frequency and operably coupled to the adaptable power converter and configured to couple wireless energy with a remote antenna. The modes are selectable to substantially maintain an efficiency in the adaptable power converter over a varying coupling coefficient between the charging base antenna and the remote antenna. One or more exemplary embodiments also include methods for performing the same.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The term "wireless power" is used herein to mean any form of energy associated with electric fields, magnetic fields, electromagnetic fields, or otherwise that is transmitted from a transmitter to a receiver without the use of physical electromagnetic conductors.

Moreover, the term "wireless charging" is used herein to mean providing wireless power to one or more electrochemical cells or systems including electrochemical cells for the purpose of recharging the electrochemical cells.

The term "battery electric vehicle" (BEV) is used herein to mean a remote system, and example of which is a vehicle that includes, as part of its locomotion abilities, electrical power derived from one or more rechargeable electrochemical cells. As non-limiting examples, some BEVs may be hybrid electric vehicles that include on-board chargers that use power from vehicle deceleration and traditional motors to charge the vehicles, other BEVs may draw all locomotion ability from electrical power. Other "remote systems" are contemplated including electronic devices and the like. Various terms and acronyms are used herein including, but not limited to, the following:

AC Alternative Current
BEV Battery Electric Vehicle
CB Charging Base
DC Direct Current
EV Electric Vehicle
FDX Full Duplex
FET Field Effect Transistor
G2V Grid-to-Vehicle
HDX Half Duplex
IGBT Insulated Gate Bipolar Transistor
ISM Industrial Scientific and Medical
LF Low Frequency
PWM Pulse Width Modulation
r.m.s. Root Mean Square
VLF Very Low Frequency
V2G Vehicle-to-Grid
ZSC Zero Current Switching By way of example and not limitation, a remote system is described herein in the form of a Battery Electric Vehicle (BEV). Other examples of remote systems are also contemplated including various electronic devices and the like capable of receiving and transferring wireless power.

Figure 1:
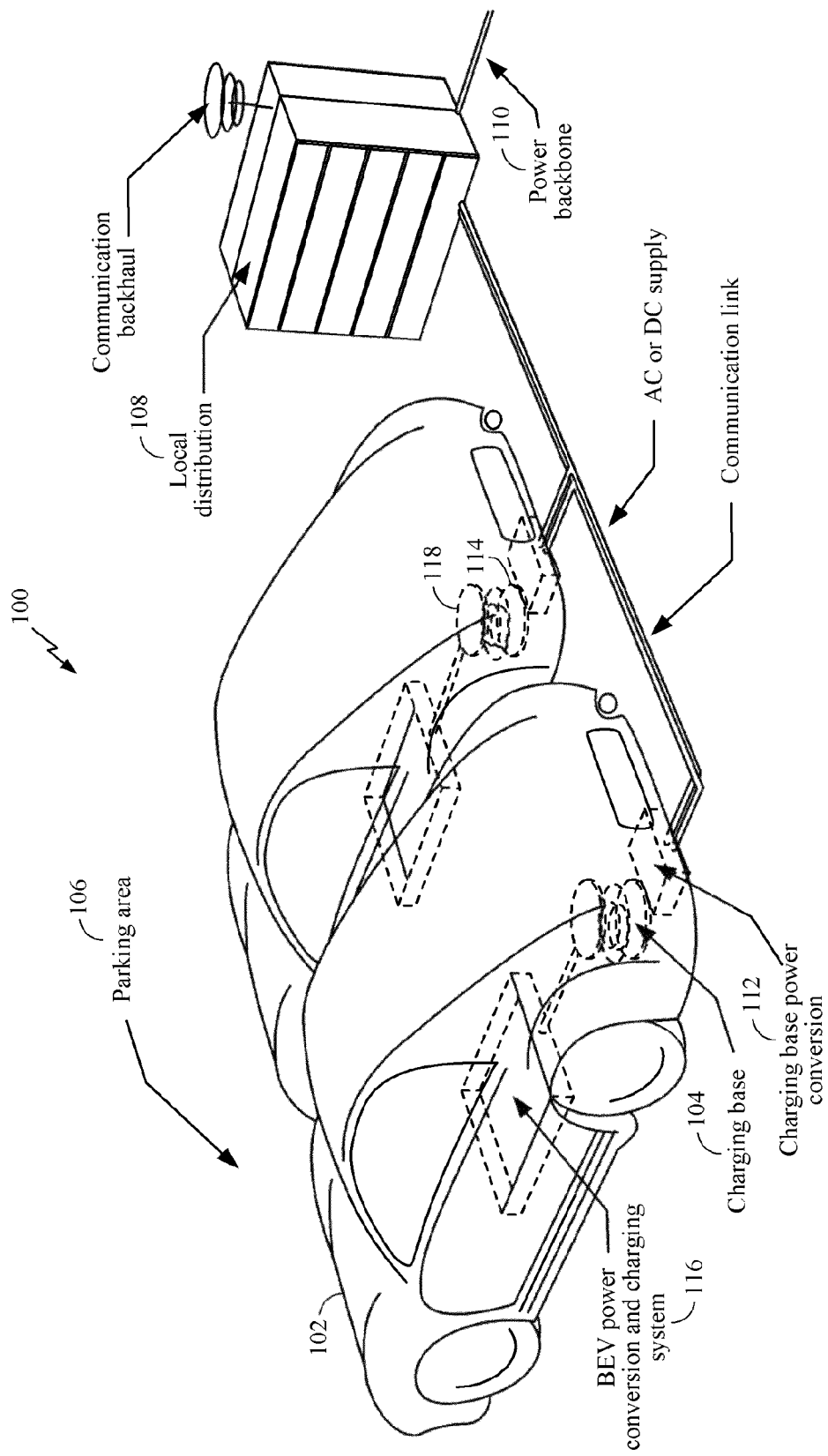
FIG. 1 illustrates a wireless charging system for remote systems such as BEVs equipped with a wireless receiver while the BEV is parked near a wireless transmitter.

FIG. 1 illustrates a wireless charging system for wireless charging enabled remote systems such as BEVs 102 while the BEV is parked near a wireless charging base (CB) 103. Two vehicles 102 are illustrated in a parking area 106 and parked over corresponding CBs 104. A local distribution center 108 is connected to a power backbone and is configured to provide an Alternating Current (AC) or a Direct Current (DC) supply to power conversion systems 112 as part of the CBs 104. The CBs 104 also include wireless power antennas 114 for generating a magnetic near field or picking-up energy from a magnetic near-field by a remote antenna. Each vehicle includes batteries, a BEV power conversion and charging system 116 and a wireless power antenna 118 interacting with the CB antenna 114 via the near-field.

In some exemplary embodiments the BEV antenna 118 may be aligned with the CB antenna 114 and, therefore, disposed within the near-field region simply by the driver positioning the vehicle correctly relative to the CB antenna 114. In other exemplary embodiments, the driver may be given visual feedback, auditory feedback, or combinations thereof to determine when the vehicle is properly placed for wireless power transfer. In yet other exemplary embodiments, the vehicle may be positioned by an autopilot system, which may move the vehicle back and forth (e.g., in zig-zag movements) until an alignment error has reached a tolerable value. This may be performed automatically and autonomously by the vehicle without or with only minimal driver intervention provided that the vehicle is equipped with a servo steering wheel, ultrasonic sensors all around and artificial intelligence. In still other exemplary embodiments, the BEV antenna 118, the CB antenna 114, or a combination thereof may include means for displacing and moving the antennas relative to each other to more accurately orient them and develop a more desirable near-field coupling therebetween.

The CBs 104 may be located in a variety of locations. As non-limiting examples, some suitable locations are a parking area at a home of the vehicle owner, parking areas reserved for BEV wireless charging modeled after conventional petroleum-based filling stations, and parking lots at other locations such as shopping centers and places of employment.

These BEV charging stations may provide numerous benefits, such as, for example:
- Convenience: charging can be performed automatically virtually without driver intervention and manipulations.
- Reliability: there may be no exposed electrical contacts and no mechanical wear out.
- Safety: manipulations with cables and connectors may not be needed, and there may be no cables, plugs, or sockets that may be exposed to moisture and water in an outdoor environment.
- Vandalism resistant: There may be no sockets, cables, and plugs visible nor accessible.
- Availability: if BEVs will be used as distributed storage devices to stabilize the grid. Availability can be increased with a convenient docking-to-grid solution enabling Vehicle to Grid (V2G) capability.
- Esthetical and non-impedimental: There may be no column loads and cables that may be impedimental for vehicles and/or pedestrians.

As a further explanation of the V2G capability, the wireless power transmit and receive capabilities can be configured as reciprocal such that the CB 104 transfers power to the BEV 102 and the BEV transfers power to the CB 104. This capability may be useful for power distribution stability by allowing BEVs to contribute power to the overall distribution system in a similar fashion to how solar-cell power systems may be connected to the power grid and supply excess power to the power grid.

Figure 2:
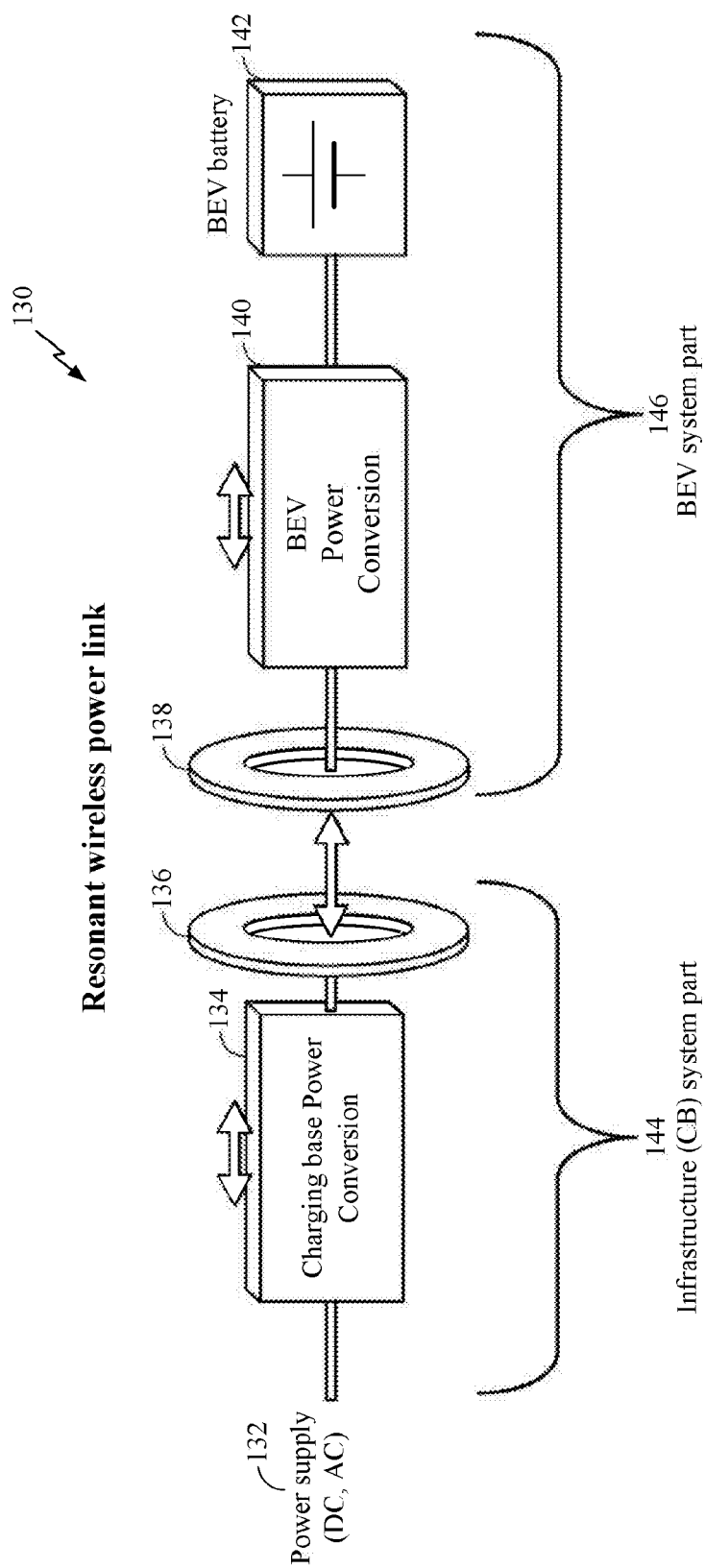
FIG. 2 is a simplified block diagram of a wireless power charging system for a BEV.

FIG. 2 is a simplified block diagram of a wireless power charging system 130 for a BEV. Exemplary embodiments described herein use capacitively loaded wire loops (i.e., multi-turn coils) forming a resonant structure that is capable to efficiently couple energy from a primary structure (transmitter) to a secondary structure (receiver) via the magnetic near field if both primary and secondary are tuned to a common resonance frequency. The method is also known as "magnetic coupled resonance" and "resonant induction."

To enable wireless high power transfer, some exemplary embodiments may use a frequency in the range from 20-60 kHz. This low frequency coupling may allow highly efficient power conversion that can be achieved using state-of-the-art solid state devices. In addition, there may be less coexistence issues with radio systems compared to other bands.

In FIG. 2, a conventional power supply 132, which may be AC or DC, supplies power to the CB power conversion module 134, assuming energy transfer towards vehicle. The CB power conversion module 134 drives the CB antenna 136 to emit a desired frequency signal. If the CB antenna 136 and BEV antenna 138 are tuned to substantially the same frequencies and are close enough to be within the near-field radiation from the transmit antenna, the CB antenna 136 and BEV antenna 138 couple such that power may be transferred to the BEV antenna 138 and extracted in the BEV power conversion module 140. The BEV power conversion module 140 may then charge the BEV batteries 142. The power supply 132, CB power conversion module 134, and CB antenna 136 make up the infrastructure part 144 of an overall wireless power system 130, which may be stationary and located at a variety of locations as discussed above. The BEV battery 142, BEV power conversion module 140, and BEV antenna 138 make up a wireless power subsystem 146 that is part of the vehicle or part of the battery pack.

In operation, assuming energy transfer towards the vehicle or battery, input power is provided from the power supply 132 such that the CB antenna 136 generates a radiated field for providing the energy transfer. The BEV antenna 138 couples to the radiated field and generates output power for storing or consumption by the vehicle. In exemplary embodiments, the CB antenna 136 and BEV antenna 138 are configured according to a mutual resonant relationship and when the resonant frequency of the BEV antenna 138 and the resonant frequency of the CB antenna 136 are very close, transmission losses between the CB and BEV wireless power subsystems are minimal when the BEV antenna 138 is located in the near-field of the CB antenna 136.

As stated, an efficient energy transfer occurs by coupling a large portion of the energy in the near-field of a transmitting antenna to a receiving antenna rather than propagating most of the energy in an electromagnetic wave to the far-field. When in this near-field a coupling mode may be developed between the transmit antenna and the receive antenna. The area around the antennas where this near-field coupling may occur is referred to herein as a near field coupling-mode region.

The CB and the BEV power conversion module may both include an oscillator, a power amplifier, a filter, and a matching circuit for efficient coupling with the wireless power antenna. The oscillator is configured to generate a desired frequency, which may be adjusted in response to an adjustment signal. The oscillator signal may be amplified by the power amplifier with an amplification amount responsive to control signals. The filter and matching circuit may be included to filter out harmonics or other unwanted frequencies and match the impedance of the power conversion module to the wireless power antenna. The CB and BEV power conversion module may also include, a rectifier, and switching circuitry to generate a suitable power output to charge the battery.

BEV and CB antennas used in exemplary embodiments may be configured as "loop" antennas, and more specifically, multi-turn loop antennas, which may also be referred to herein as a "magnetic" antenna. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As stated, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, a capacitor may be added in series with the antenna to create a resonant circuit that generates a magnetic field. Accordingly, for larger diameter loop antennas, the size of capacitance needed to induce resonance decreases as the diameter or inductance of the loop increases. It is further noted that inductance may also depend on a number of turns of a loop antenna. Furthermore, as the diameter of the loop antenna increases, the efficient energy transfer area of the near-field increases. Of course, other resonant circuits are possible. As another non-limiting example, a capacitor may be placed in parallel between the two terminals of the loop antenna (i.e., parallel resonant circuit).

Exemplary embodiments of the invention include coupling power between two antennas that are in the near-fields of each other. As stated, the near-field is an area around the antenna in which electromagnetic fields exist but may not propagate or radiate away from the antenna. Near-field coupling-mode regions are typically confined to a volume that is near the physical volume of the antenna e.g. within a radius of one sixth of the wavelength. In the exemplary embodiments of the invention, magnetic type antennas such as single and multi-turn loop antennas are used for both transmitting and receiving since magnetic near-field amplitudes in practical embodiments tend to be higher for magnetic type antennas in comparison to the electric near-fields of an electric-type antenna (e.g., a small dipole). This allows for potentially higher coupling between the pair. Another reason for relying on a substantially magnetic field is its low interaction with non-conductive dielectric materials in the environment and the safety issue. Electric antennas for wireless high power transmission may involve extremely high voltages. Furthermore, "electric" antennas (e.g., dipoles and monopoles) or a combination of magnetic and electric antennas is also contemplated.

Figure 3:
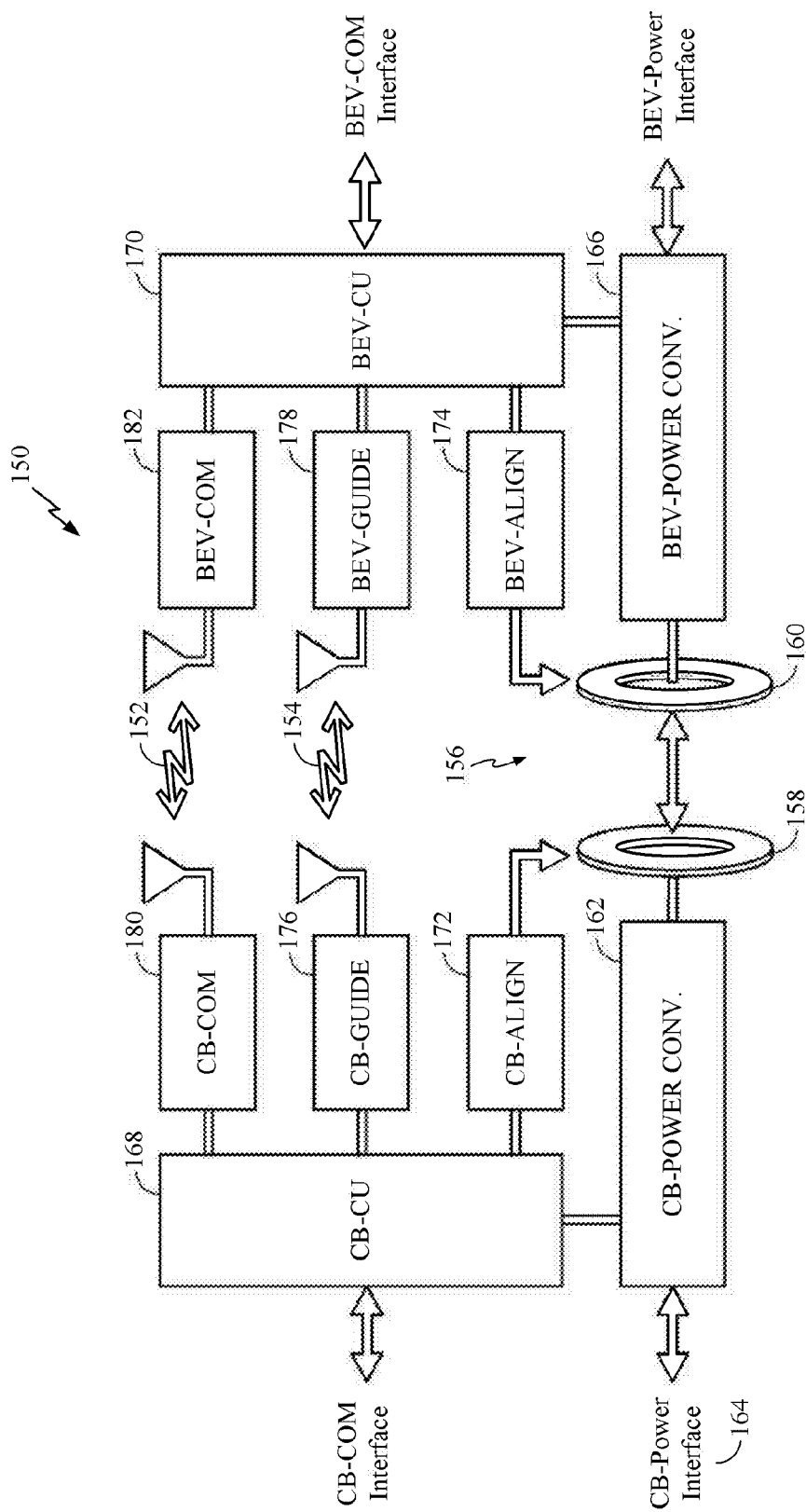
FIG. 3 is a more detailed block diagram of a wireless power charging system for a BEV illustrating communication links, guidance links, and alignment systems for the transmit antenna and receive antenna.

FIG. 3 is a more detailed block diagram of a generic wireless power charging system 150 for a BEV illustrating communication links 152, guidance links 154, and alignment systems 156 for the CB antenna 158 and BEV antenna 160. As with the exemplary embodiment of FIG. 2 and assuming energy flow towards BEV, in FIG. 3 the CB power conversion unit 162 receives AC or DC power from the CB power interface 164 and excites the CB antenna 158 at or near its resonant frequency. The BEV antenna 160, when in the near field coupling-mode region, receives energy from the near field coupling mode region to oscillate at or near the resonant frequency. The BEV power conversion unit 166 converts the oscillating signal from the receive antenna 160 to a power signal suitable for charging the battery.

The generic system may also include a CB communication unit 168 and a BEV communication unit 170, respectively. The CB communication unit 168 may include a communication interface to other systems (not shown) such as, for example, a computer, and a power distribution center. The BEV communication unit 170 may include a communication interface to other systems (not shown) such as, for example, an on-board computer on the vehicle, other battery charging controller, other electronic systems within the vehicles, and remote electronic systems.

The CB and BEV communication units may include subsystems or functions for specific application with separate communication channels therefore. These communications channels may be separate physical channels or just separate logical channels. As non-limiting examples, a CB alignment unit 172 may communicate with a BEV alignment unit 174 to provide a feedback mechanism for more closely aligning the CB antenna 158 and BEV antenna 160, either autonomously or with operator assistance. Similarly, a CB guide unit 176 may communicate with a BEV guide unit 178 to provide a feedback mechanism to guide an operator in aligning the CB antenna 158 and BEV antenna 160. In addition, there may be a separate general-purpose communication channel 152 supported by CB communication unit 180 and BEV communication unit 182 for communicating other information between the CB and the BEV. This information may include information about EV characteristics, battery characteristics, charging status, and power capabilities of both the CB and the BEV, as well as maintenance and diagnostic data. These communication channels may be separate physical communication channels such as, for example, Bluetooth, zigbee, cellular, etc.

In addition, some communication may be performed via the wireless power link without using specific communications antennas. In other words the communications antenna and the wireless power antenna are the same. Thus, some exemplary embodiments of the CB may include a controller (not shown) for enabling keying type protocol on the wireless power path. By keying the transmit power level (Amplitude Shift Keying) at predefined intervals with a predefined protocol, the receiver can detect a serial communication from the transmitter. The CB power conversions module 162 may include a load sensing circuit (not shown) for detecting the presence or absence of active BEV receivers in the vicinity of the near-field generated by the CB antenna 158. By way of example, a load sensing circuit monitors the current flowing to the power amplifier, which is affected by the presence or absence of active receivers in the vicinity of the near-field generated by CB antenna 158. Detection of changes to the loading on the power amplifier may be monitored by the controller for use in determining whether to enable the oscillator for transmitting energy, to communicate with an active receiver, or a combination thereof.

BEV circuitry may include switching circuitry (not shown) for connecting and disconnecting the BEV antenna 160 to the BEV power conversion unit 166. Disconnecting the BEV antenna not only suspends charging, but also changes the "load" as "seen" by the CB transmitter, which can be used to "cloak" the BEV receiver from the transmitter. The load changes can be detected if the CB transmitter includes the load sensing circuit. Accordingly, the CB has a mechanism for determining when BEV receivers are present in the CB antenna's near-field.

Figure 4:
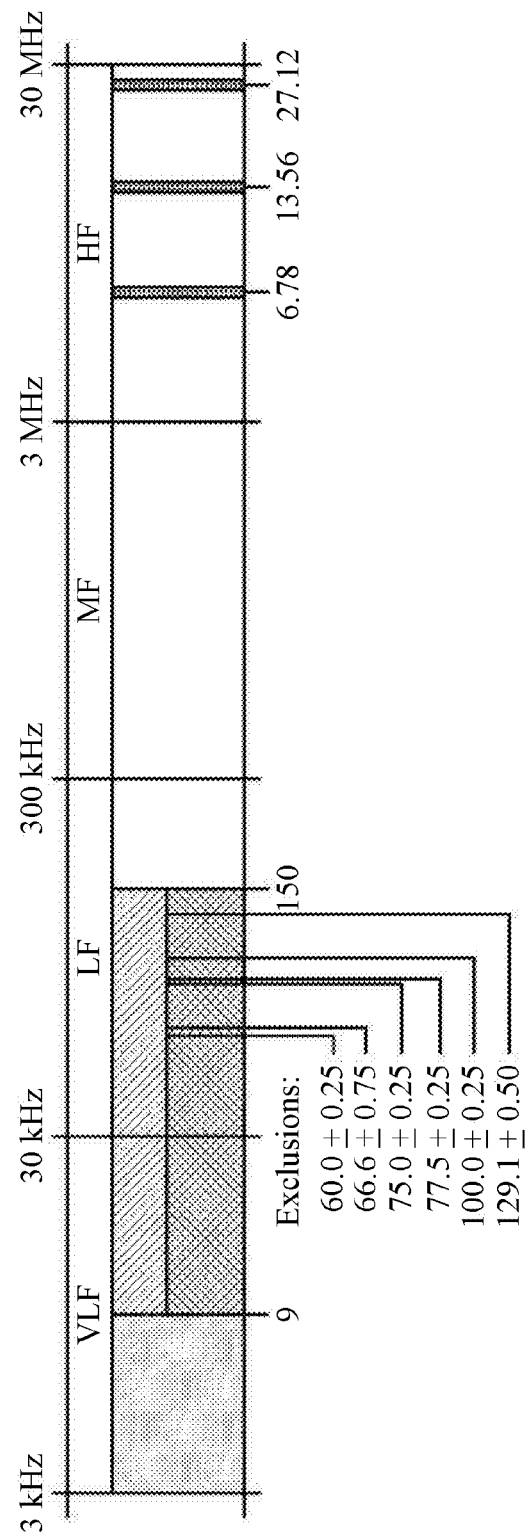
FIG. 4 illustrates a frequency spectrum showing various frequencies that may be available for wireless charging of BEVs.

FIG. 4 illustrates a frequency spectrum showing various frequencies that may be available and suitable for wireless charging of BEVs. Some potential frequency ranges for wireless high power transfer to BEVs include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 5:
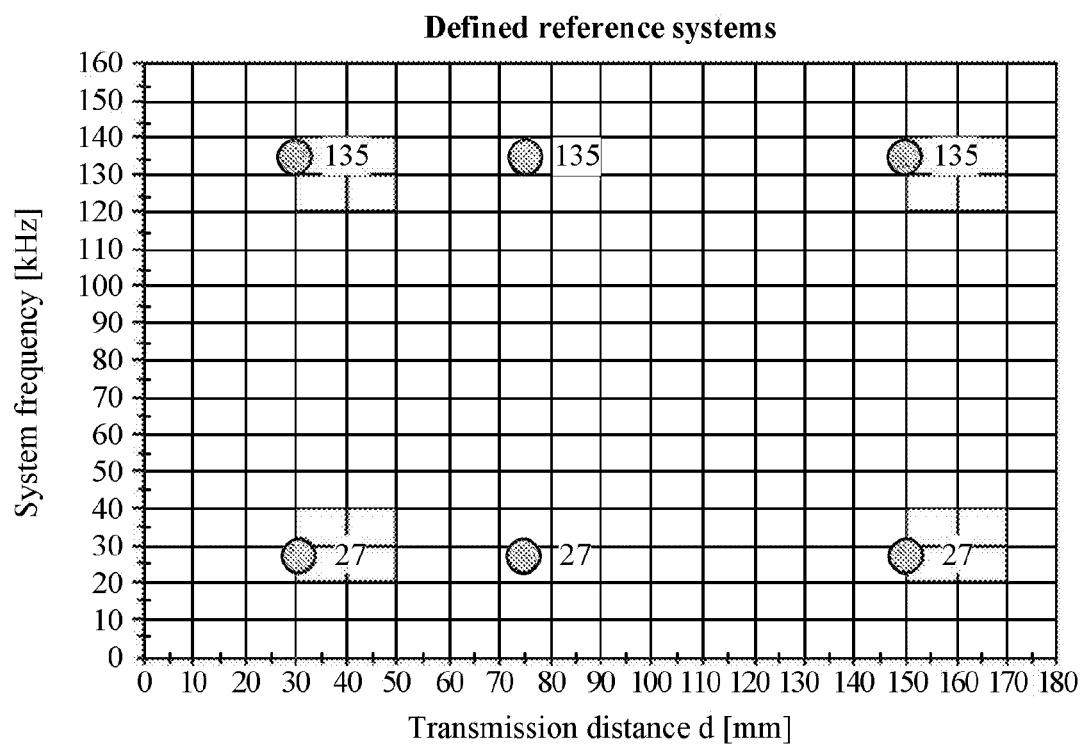
FIG. 5 illustrates some possible frequencies and transmission distances that may be useful in wireless charging of BEVs.

FIG. 5 illustrates some possible frequencies and transmission distances that may be useful in wireless charging of BEVs. Some example transmission distances that may be useful for BEV wireless charging are about 30 mm, about 75 mm, and about 150 mm. Some exemplary frequencies may be about 27 kHz in the VLF band and about 135 kHz in the LF band.

Many considerations should be taken into account on determining a suitable frequency beyond just the resonance characteristics and coupling-mode region of the receive and transmit antennas. Wireless power frequencies may interfere with frequencies used for other applications. As non-limiting examples, there may be VLF/LF coexistence issues with power line frequencies, audible frequencies and communication frequencies. Some non-limiting examples where coexistence may be an issue for VLF and LF are: frequencies for radio controlled clocks, frequencies for LW AM broadcasts and other radio services, cross-coupling to ISDN/ADSL and ISDN/xDSL communication channels, electronic vehicle immobilization systems, RFID (Radio Frequency Identification) systems, EAS (Electronic Article Surveillance) systems, on-site paging, Low Voltage PLC systems, medical implants (cardiac pacemakers, etc.), audio systems and acoustic emission perceivable by humans and animals.

Some non-limiting examples where coexistence may be an issue for HF frequencies are industrial, scientific and medical (ISM) radio bands, such as: 6.78 MHz for remote control applications and RFID in FDX or HDX mode with continuous energy transfer; 13.56 MHz for RFID in FDX or HDX mode with continuous energy transfer as well as portable device wireless power; and 27.12 MHz for Railway applications (Eurobalise 27.095 MHz), Citizen band radio, and remote control (e.g., models, toys, garage door, computer mouse, etc.).

Figure 6:
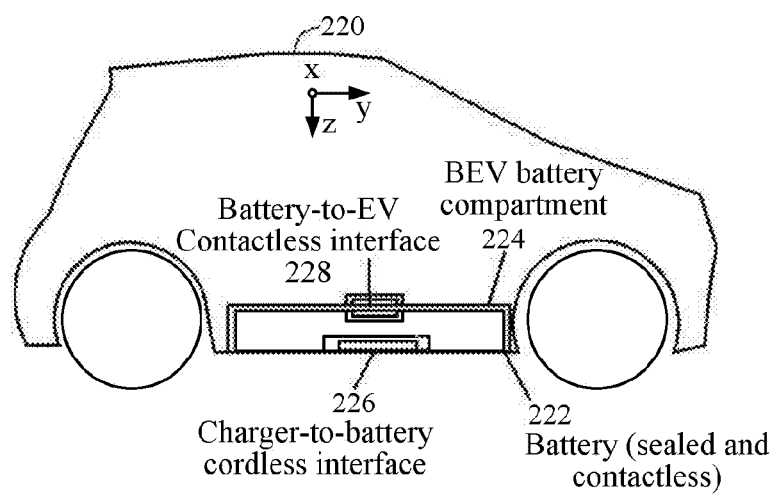
FIG. 6 shows a simplified diagram of a replaceable contactless battery disposed in a BEV.

FIG. 6 shows a simplified diagram of a rechargeable and/or replaceable battery disposed in a battery electric vehicle (BEV) 220. In this exemplary embodiment, the low battery position may be useful for a battery unit 222 that integrates a wireless power interface 226 and that can receive power from a charger embedded in the ground. In FIG. 6, the EV rechargeable battery unit 222 is accommodated in a battery compartment 224. The battery unit 222 also provides a wireless power interface 226, which may integrate the entire BEV sided wireless power subsystem comprising the resonant magnetic antenna, power conversion and other control and communications functions as needed for efficient and safe wireless energy transfer between a ground-embedded charging base (CB) and the Electric Vehicle (EV) battery.

It may be useful for the BEV antenna to be integrated flush with a bottom side of battery unit 222 (vehicle body) so that there are no protrusive parts and so that the specified ground-to-vehicle body clearance can be maintained. This configuration may require some room in the battery unit dedicated to the wireless power subsystem.

In some exemplary embodiments, the CB antenna and the BEV antenna are fixed in position and the antennas are brought within a near-field coupling region by overall placement of the BEV relative to the CB. However, in order to perform energy transfer rapidly, efficiently, and safely, the distance between the charging base antenna and the BEV antenna may need to be reduced to improve magnetic coupling. Thus, in some exemplary embodiments, the CB antenna and the BEV antenna may be deployable moveable to bring them into better alignment. Also illustrated in FIG. 6 is a battery unit 222 that provides contactless power and communications interfaces 226/228.

Figure 7:
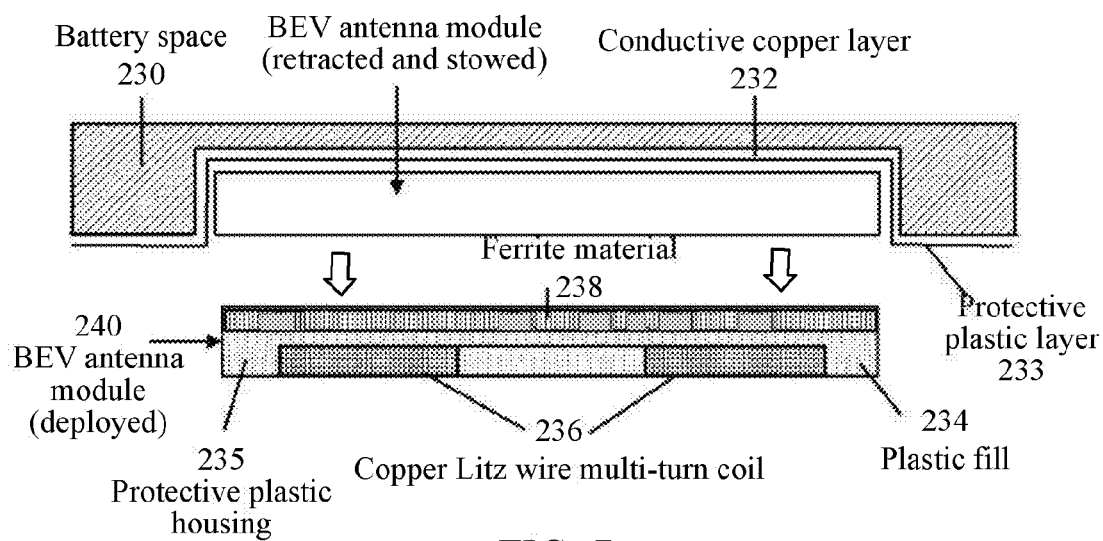
FIG. 7 is a detailed diagram of a wireless power antenna and ferrite material placement relative to a battery.

FIG. 7 is a more detailed diagram of a loop antenna and ferrite material placement relative to a battery. In various exemplary embodiments, the battery unit includes one of a deployable and non-deployable BEV antenna module 240 as part of the wireless power interface. To prevent magnetic fields from penetrating into the battery unit 230 and into the interior of the vehicle, there may be a conductive shielding 232 (e.g., a copper sheet) between the battery unit and the vehicle. Furthermore, a non-conductive (e.g., plastic) layer 234 may be used to protect the conductive shield 232, the coil 236, and the ferrite material 238 from all sorts of environmental impacts (e.g., mechanical damage, oxidization, etc.).

FIG. 7 shows a fully ferrite embedded antenna coil 236. The coil 236 itself may be made, for example only, of stranded Litz wire. FIG. 7 also shows a dimensioned ferrite plate 238 (i.e., ferrite backing) to enhance coupling and to reduce eddy currents (heat dissipation) in the conductive shield 232. The coil 236 may be fully embedded in a non-conducting non-magnetic (e.g. plastic) material 234. There may be a separation between coil 236 and ferrite plate 238 in general, as the result of a trade-off between magnetic coupling and ferrite hysteresis losses.

Furthermore, the coil 236 may be movable in lateral X and/or Y directions. FIG. 7 specifically illustrates an exemplary embodiment wherein the antenna (coil) module 240 is deployed in a downward Z direction. The physical separation of the antenna module 240 from the battery unit 230 may have a positive effect on the antennas performance.

Figure 8:
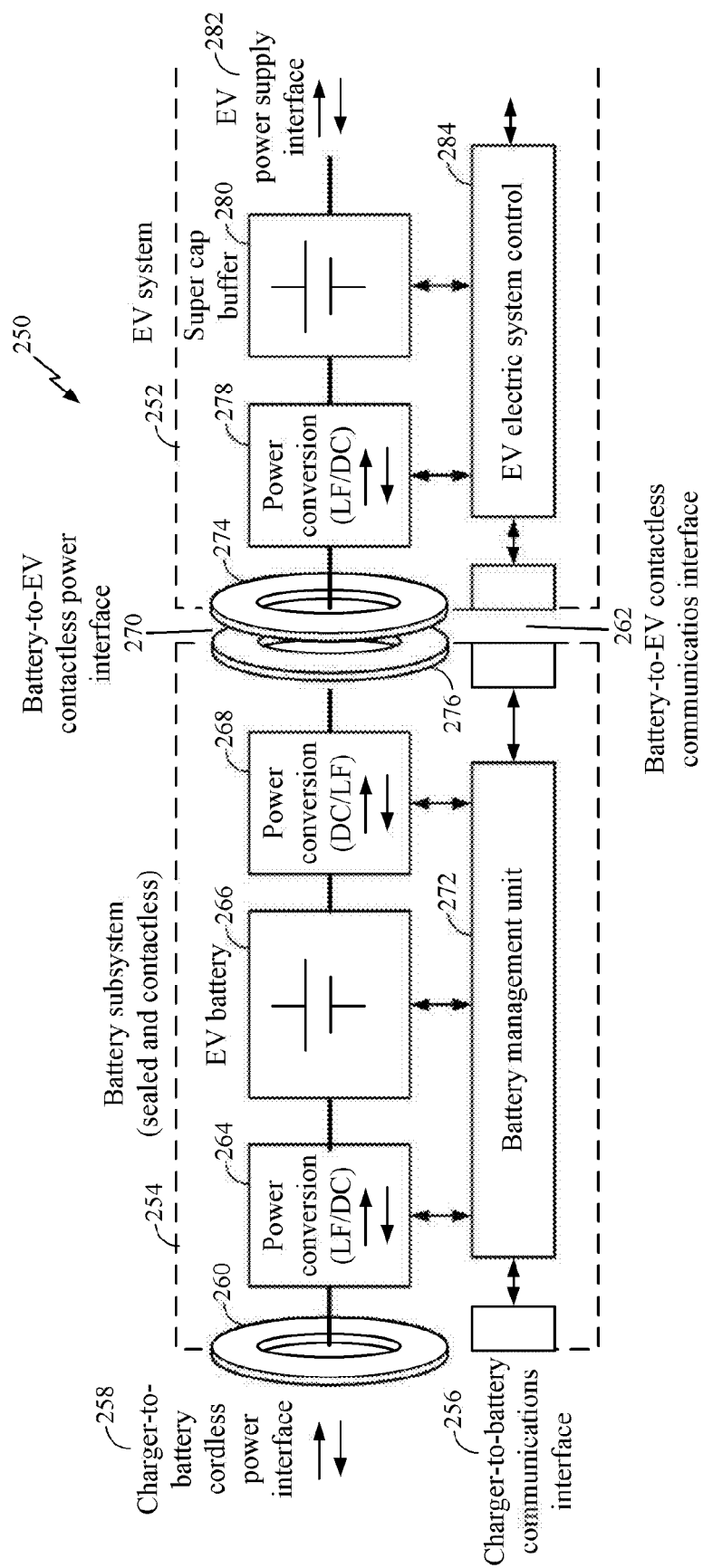
FIG. 8 is a simplified block diagram of portions of a battery system in a BEV equipped to wirelessly receive or transmit power.

FIG. 8 is a simplified block diagram of portions of a battery system 250 in a BEV equipped to receive wireless power. This exemplary embodiment illustrates wireless power interfaces that may be used between an EV system 252, a battery subsystem 254, and the wireless charging interface to a CB (not shown). The battery subsystem 254 provides for both energy transfer and communications with a wireless interface between the EV and the battery subsystem 254, which enables a completely contactless, closed, and sealed battery subsystem. The interface may include the functionality for bidirectional (two-way) wireless energy transfer, power conversion, control, battery management, and communications. While a contactless connection between the battery and the BEV is illustrated, a contact connection is also contemplated.

The charger to battery communication interface 256 and wireless power interface 258 has been explained above and it shall be noted again that FIG. 8 shows a generic concept. In specific embodiments, the wireless power antenna 260 and the communications antenna may be combined to a single antenna. This may also apply to the battery-to-EV wireless interface 262. The power conversion (LF/DC) unit 264 converts wireless power received from the CB to a DC signal to charge the EV battery 266. A power conversion (DC/LF) 268 supplies power from the EV battery 266 to a wireless power interface 270 between the battery subsystem 254 and the EV system 252. A battery management unit 272 may be included to manage EV battery charging, control of the power conversion units (LF/DC and DC/LF), as well as a wireless communication interface.

In the EV system 252, a wireless power antenna 274 receives power from antenna 276 and a LF/DC power conversion unit 278 may supply a DC signal to a super capacitor buffer 280. In some exemplary embodiments, LF/DC power conversion unit 278 may supply a DC signal directly to the EV power supply interface 282. In other exemplary embodiments, a contactless interface may not be capable of providing the high battery peak current required by the vehicles drive train e.g., during acceleration. To decrease the source resistance and thus the peak power capability of the EVs energy storage system as "seen" at the EV power supply terminals, an additional super capacitor buffer may be employed. An EV electrical system control unit 284 may be included to manage control of the power conversion unit (LF/DC) 278, charging of the super capacitor buffer 280, as well as a wireless communication interface 262 to the EV and the battery subsystem 254. Furthermore, it is noted that V2G capabilities, as described above, may apply to the concepts described with reference to, and illustrated in, FIG. 8.

Exemplary embodiments of the present invention, as described below, are directed toward alignment of wireless power antennas as part of a wireless charging system for BEVs (also referred to herein as a "BEV wireless charging system"). As will be appreciated by a person having ordinary skill in the art, adequate antenna alignment may enable two-way (bidirectional) energy transfer between a charging base, positioned within, for example, a parking space, and a BEV subsystem, in a quick, efficient, and safe manner. According to one or more exemplary embodiments, a vehicle guidance system may provide coarse alignment for adequately positioning a BEV within a parking space to enable a CB antenna and a BEV antenna to be aligned within a specific error radius. Furthermore, according to one or more other exemplary embodiments, an antenna alignment system may be configured to mechanically adjust a position of a CB antenna, a BEV antenna, or both in one or more directions to enable for fine alignment of antennas within a BEV wireless charging system.

Figure 9:
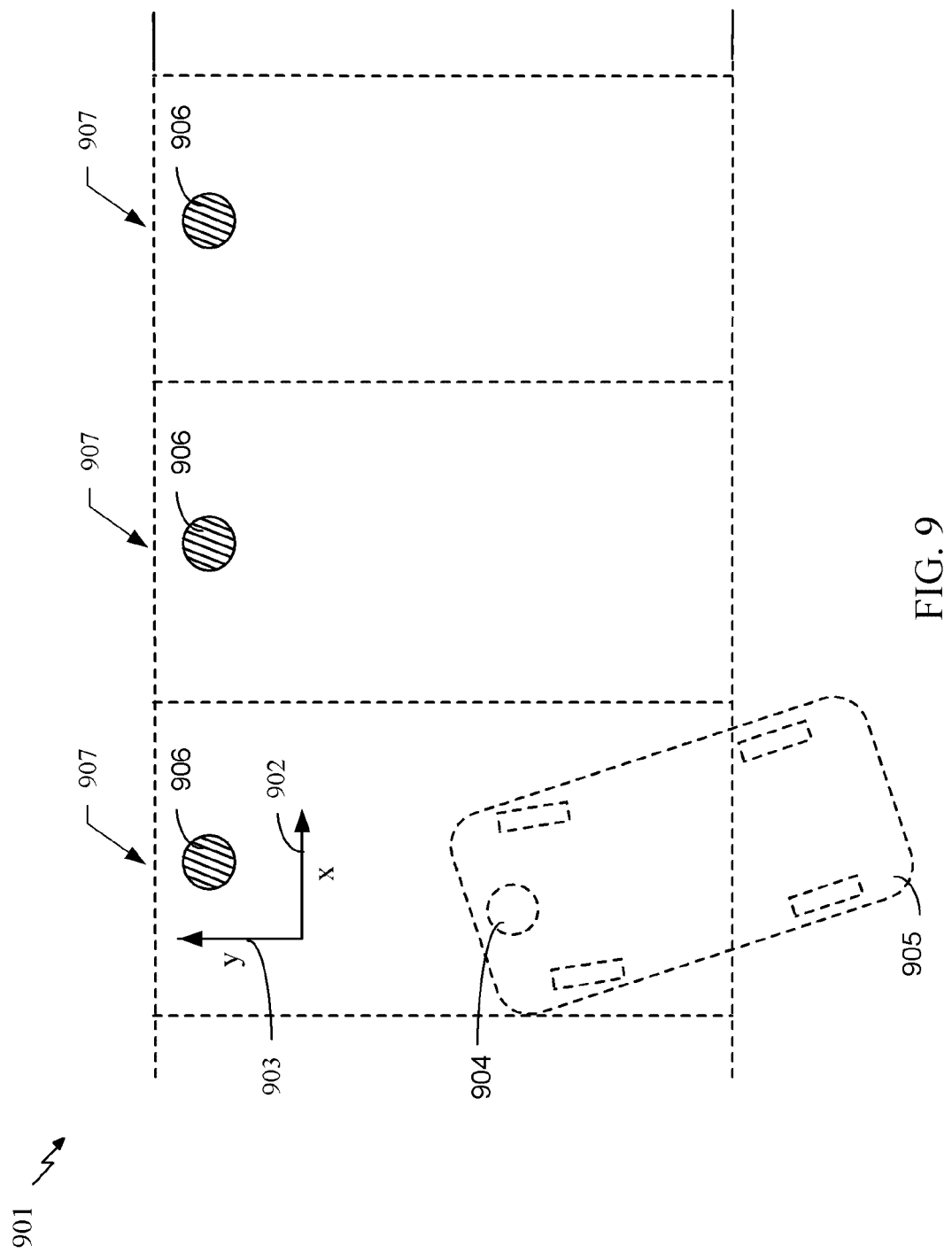
FIG. 9 illustrates a parking lot comprising a plurality of parking spaces and a charging base positioned within each parking space, in accordance with an embodiment of the present invention.

FIG. 9 illustrates a parking lot 901 comprising a plurality of parking spaces 907. It is noted that a "parking space" may also be referred to herein as a "parking area." To enhance the efficiency of a vehicle wireless charging system, a BEV 905 may be aligned along an X direction (depicted by arrow 902 in FIG. 9) and a Y direction (depicted by arrow 903 in FIG. 9) to enable a wireless power vehicle base 904 within BEV 905 to be adequately aligned with a wireless power charging base 906 within an associated parking space 907. Although parking spaces 907 in FIG. 9 are illustrated as having a single charging base 906, embodiments of the present invention are not so limited. Rather, parking spaces are contemplated that may have one or more charging bases.

Furthermore, embodiments of the present invention are applicable to parking lots having one or more parking spaces, wherein at least one parking space within a parking lot may comprise a charging base. Furthermore, guidance systems (not shown) may be used to assist a vehicle operator in positioning a BEV in a parking space 907 to enable a vehicle base (e.g., vehicle base 904) within the BEV to be aligned with a charging base 906. Exemplary guidance systems may include electronic-based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting a BEV operator in positioning a BEV to enable an antenna within the BEV to be adequately aligned with a charging antenna within a charging base (e.g., charging base 906).

Figure 10A:
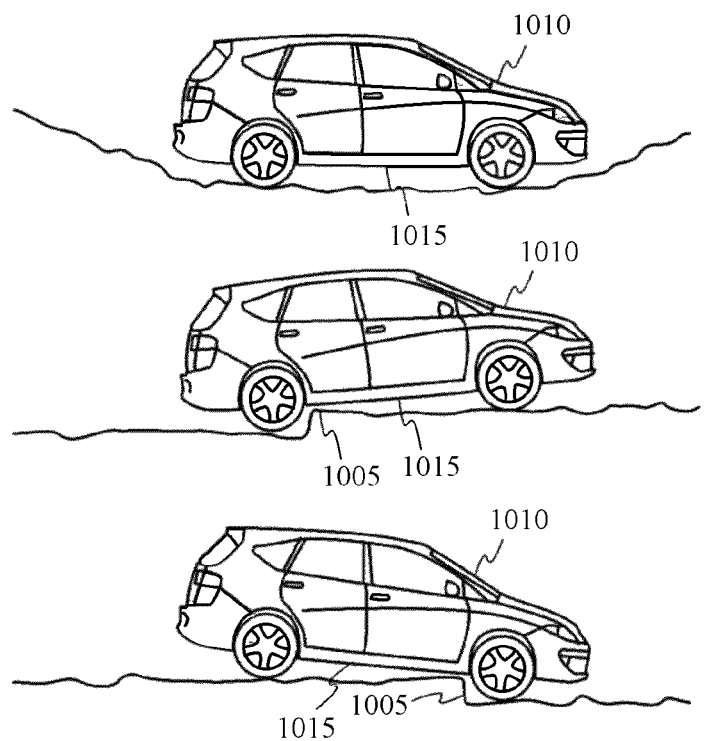
FIG. 10A illustrates various obstructions that may be encountered by a vehicle, which may require chassis clearance.

FIG. 10A illustrates that various obstructions 1005 may be encountered by a BEV 1010 requiring a minimum chassis clearance. The obstructions 1005 may contact the underside 1015 of the chassis of the BEV 1010 at different locations. When a wireless power antenna (not shown) is located within or near the underside 1015 of the chassis of the BEV 1010, the wireless power antenna may become damaged, misaligned, or have other problems associated with obstructions 1005 contacting the wireless power antenna.

Figure 10B:
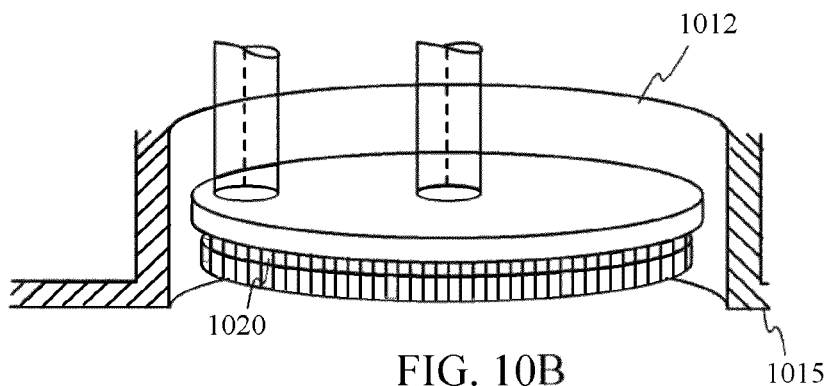
FIG. 10B illustrates a wireless power antenna located within a cavity of the underside of the chassis of a vehicle according to an exemplary embodiment of the present invention.

FIG. 10B illustrates a BEV antenna 1020 according to an exemplary embodiment of the present invention. In order to protect the BEV antenna 1020 from undesirable contact from obstructions, it may be desirable to locate the BEV antenna 1020 within a cavity 1012 of the underside of the chassis of a BEV 1010.

A charging base may include a power conversion unit operably coupled with a CB antenna. The charging base may further include other mechanical or electronic components (e.g., processor) that may be used for position adjustment of the CB antenna as will be described herein. Components of the charging base may be housed within a charging base that is at least partially embedded below a ground surface, such as in a parking lot, driveway, or garage.

Figure 11:
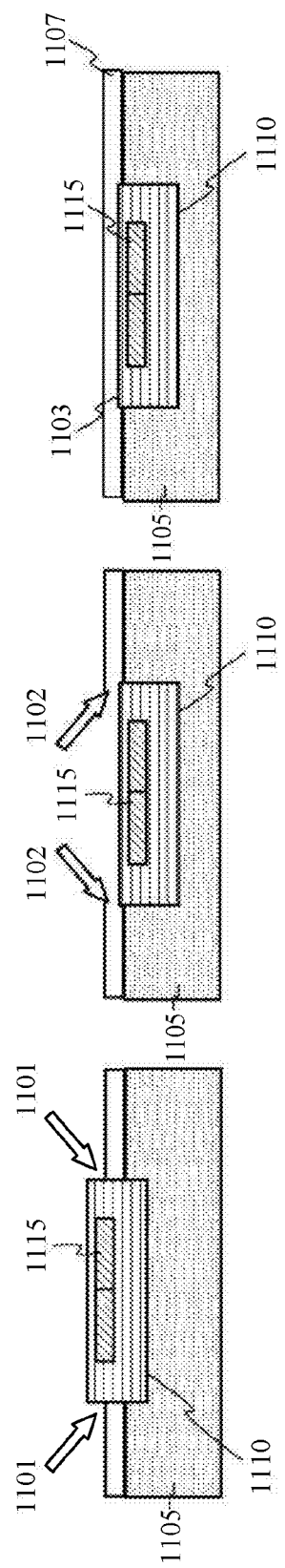
FIG. 11 illustrates several variants of embedding a charging base according to exemplary embodiments of the present invention.

FIG. 11 illustrates a charging base 1110 at least partially embedded below a ground surface 1105 according to an exemplary embodiment of the present invention. The charging base 1110 may include one or more CB antennas 1115 for transmitting or receiving a wireless power signal to/from a corresponding BEV antenna (not shown) associated with a BEV. The charging base 1110 may be protrusive 1101 from the ground, which may improve coupling as the distance between the CB antenna 1115 and BEV antenna may be reduced. A protrusive 1101 charging base 1110 may be more accessible for maintenance and repair. However, a protrusive 1101 charging base 1110 may be an impediment, such as for pedestrians or during snow removal.

Alternatively, the charging base 1110 may be flush 1102 with the surface of the ground 1105. A flush 1102 charging base 1110 may be more accessible for maintenance and repair and non-impedimental; however, coupling between the CB antenna 1115 and BEV antenna may be reduced in comparison to the protrusive 1101 charging base 1110. A flush 1102 charging base 1110 may also leave a potential problem with the edge of the ground surface (e.g., asphalt) potentially being more prone to erosion by water, ice and mechanical stress.

Alternatively, a charging base 1110 may be located completely below 1103 the surface of the ground (e.g., below the asphalt layer 1107). Such a below-surface 1103 charging base 1110 may be more secure from intruders (e.g., vandalism), and be non-impedimental; however, coupling and accessibility to maintenance and repair may be reduced.

Figure 12A:
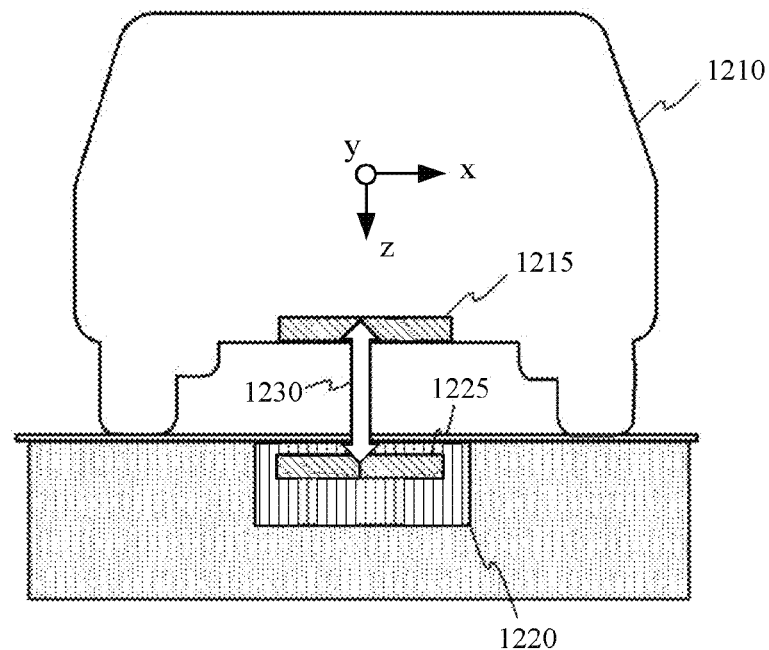
FIGS. 12A-12C illustrate a vehicle including a wireless power antenna positioned over a charging base including a wireless power antenna according to an exemplary embodiment of the present invention.
Figure 12B:
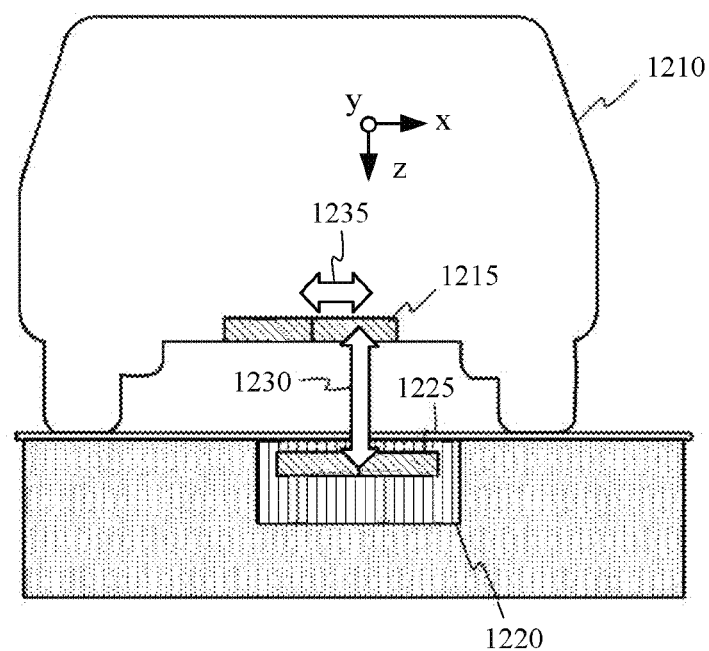
Figure 12C:
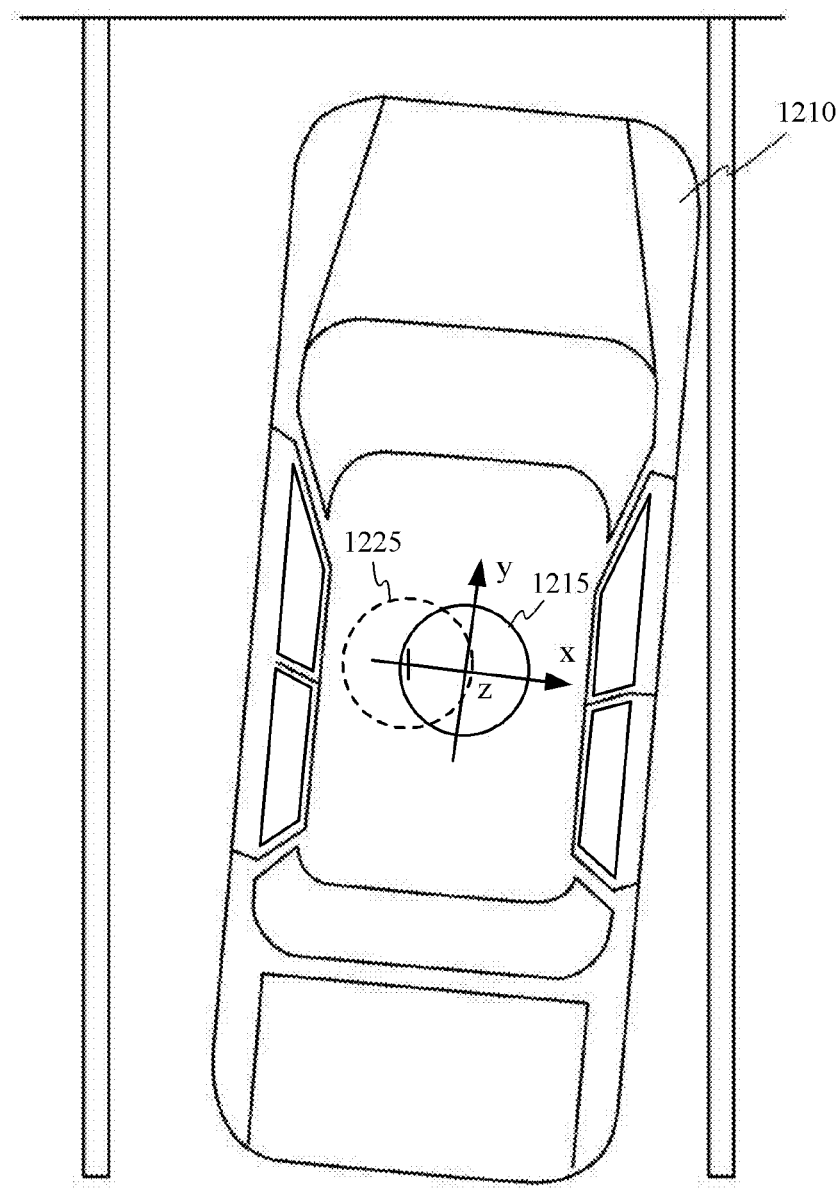

FIG. 12A-12C illustrate a BEV 1210 including a wireless power antenna 1215 positioned over a charging base 1220 also including a wireless power antenna 1225. As shown in FIGS. 12A-12C, the BEV antenna 1210 and the CB antenna 1225 are aligned in the X and Y directions, and separated by a distance 1230 in the Z direction. As shown in FIG. 12B, the BEV antenna 1210 and the CB antenna 1225 are misaligned by an offset distance 1235 in the X direction, and are separated by a distance 1230 in the Z direction.

It may be desirable to reduce the distance 1230 and the offset distance 1235 in order to improve coupling strength between the BEV antenna 1215 and the CB antenna 1225. Reducing the distance 1230 and the offset distance 1235 may occur through a fine alignment adjustment system.

The fine alignment adjustment system may be used to adjust the physical position of the CB antenna 1225, the BEV antenna 1215, or a combination thereof in order to increase coupling strength between the CB antenna 1225 and the BEV antenna 1215. Adjusting the position of one or both of the BEV antenna 1215 and CB antenna 1225 may be performed in response to a detection of misalignment therebetween. Determining misalignment may be performed by utilizing information from the vehicle guidance system, as described above, such as for the methods related to magnetic field detection. Furthermore, information from a wireless power link (e.g., various parameters indicative of the performance of the wireless power link) may be used in determining misalignment of associated antennas. For example, during misalignment detection, the wireless power link may be operated at a reduced power level and after associated antennas have been accurately aligned, the power level may be increased.

The fine alignment adjustment system may be separated from, or in addition to the course alignment guidance system. For example, the course alignment guidance system may guide a BEV into a position within a given tolerance (i.e., error radius), such that a fine alignment adjustment system can correct for fine errors between the BEV antenna 1215 and the CB antenna 1225.

As shown in the overhead view of BEV 1210 in FIG. 12C, the BEV antenna 1210 and the CB antenna 1225 are misaligned only in the X direction. The BEV antenna 1210 and CB antenna 1220 are aligned in the Y direction. For example, the alignment in the Y direction may have been accomplished by the BEV 1210 using its own traction system, which may be assisted (e.g., auto-piloted) by the guidance system described herein, and by which the BEV's motor may be able to move smoothly and accurately to a target Y position. In such a scenario, alignment error in the X direction may still exist but not in the Y direction. Eliminating the need for alignment adjustment in the Y direction (e.g., through use of a course alignment guidance system) may also reduce space requirements for BEV antenna 1215 as the BEV antenna 1215 may be configured to move only in X direction, which may be accommodated in a cavity and not deployed for wireless power transfer. Thus, eliminating the need for fine alignment in the Y direction may simplify the BEV wireless power subsystem.

Figure 13A:
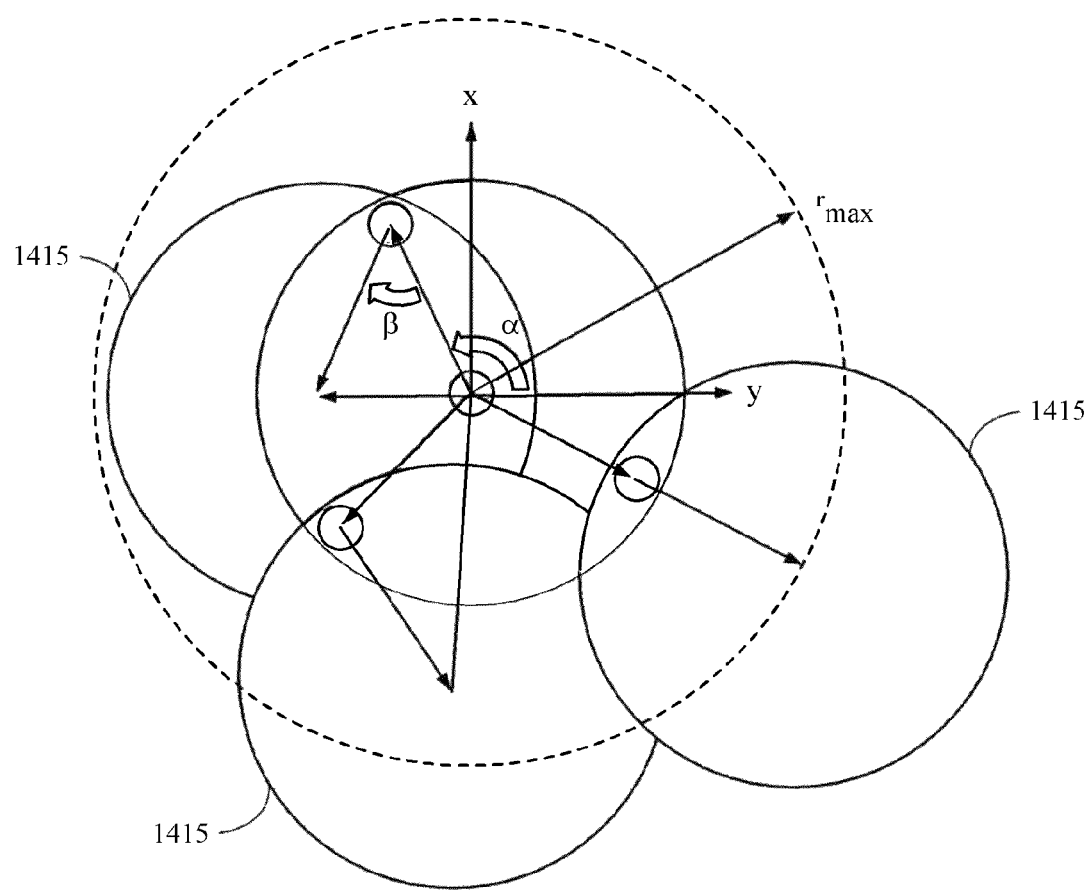
FIGS. 13A and 13B illustrate possible locations in the X and Y direction that a mechanical device may adjust the position of a wireless power antenna according to an exemplary embodiment of the present invention.
Figure 13B:
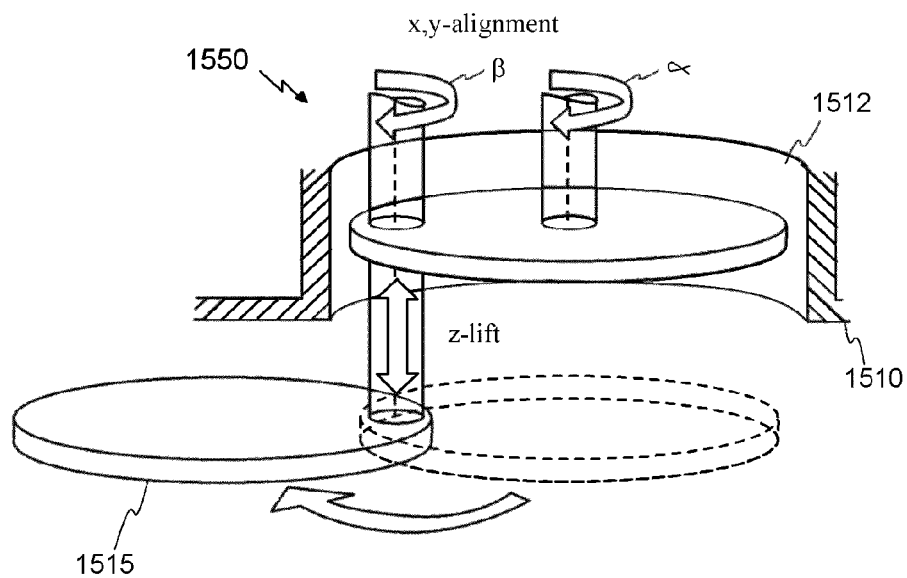

FIGS. 13A and 13B illustrate possible locations in the X and Y direction that a mechanical device may adjust the position of a BEV antenna 1415 according to an exemplary embodiment of the present invention. For example, by selecting an angle pair ($\alpha$, $\beta$) within the mechanical device, any position in the X and Y directions may be achieved within a radius $r_{max}$.

FIG. 13B illustrates a mechanical solution for a BEV antenna 1515 that is located within a cavity 1512 of the underside of a BEV 1510 according to an exemplary embodiment of the present invention. As shown in FIG. 13B, mechanical device 1550 may adjust the position of the BEV antenna 1515 in the X and Y directions by selecting an appropriate angle pair ($\alpha$, $\beta$). Additionally, mechanical device 1550 may adjust the position of the BEV antenna 1515 in the Z direction by lowering the BEV antenna 1515 from the cavity 1512 of the BEV 1510. Mechanical device 1550 may include one of many mechanical solutions including electric driven mechanics and/or hydraulics. Although not shown herein, a mechanical device may similarly be used to adjust the position of the CB antenna in the X, Y, or Z directions, or any combination thereof. In other words, fine alignment adjustment may be accomplished with a mechanical solution for adjusting the position of the CB antenna, the BEV antenna 1515, or both, as the case may be.

Figure 14:
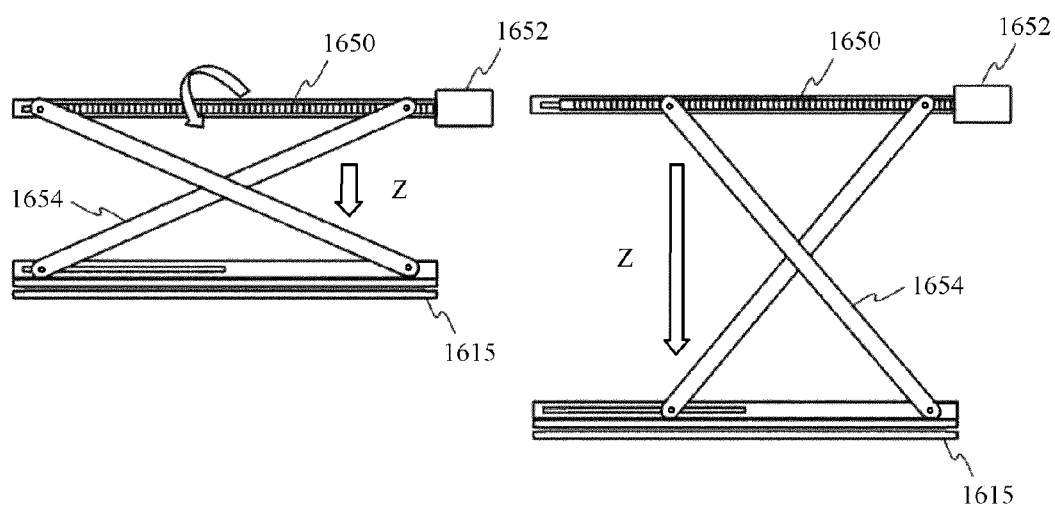
FIG. 14 illustrates another mechanical solution in which the wireless power antenna may be repositioned by a gear shaft operably coupled to a drive mechanism according to an exemplary embodiment of the present invention.

FIG. 14 illustrates another mechanical solution in which the BEV antenna 1615 (and/or CB antenna) may be repositioned by a gear shaft 1650 operably coupled to a drive mechanism 1652 according to an exemplary embodiment of the present invention. In operation, if the drive mechanism 1652 is actuated, the gear shaft 1650 may be rotated to extend the support member 1654 in order to lower the BEV antenna 1615 in the Z direction.

The fine alignment adjustment may also accomplished with the assistance of an electrical solution (e.g., electronically switched coil arrays) altering the flux lines of the electric field generated by the wireless power transmitter. A combination of mechanical and electrical alignment of the antennas may be used.

The BEV antenna may be located along the underside of the chassis of BEV. Rather than the charging base being at least partially embedded below the surface of the ground as previously described, a charging base may be configured as a charging platform located above the surface of the ground. Such a configuration may be desirable as a retrofit solution for a garage or carport if forming a hole in the ground for a charging base is undesired. A configuration of a charging platform may also provide flexibility as the charging platform may mobile and able to be stored in a location other than a garage or transferred to another location.

The charging base (e.g., charging platform) may be configured to move automatically (e.g., as an automated robot), be controlled remotely (e.g., via a remote control unit), or through other methods for control of a mobile charging platform. For example, the BEV (e.g., through its wireless power subsystem) may request a charge, whereupon the charging base may move automatically underneath the BEV and position itself to align the CB wireless power antenna with the BEV antenna. Further fine alignment (if necessary) may be accomplished through adjusting the position of the BEV antenna and CB antenna in one or more direction as previously described.

Once sufficiently aligned, charging base may more efficiently transfer wireless power between a charging base and a wireless power subsystem of the BEV. After charging is completed, or after some other event, the charging base may return back to a waiting position (standby mode). The wireless power system may, therefore, include a communication link with the charging base and another device (e.g., wireless power subsystem) associated with the BEV. The charging base may further include cable management in order to uncoil and coil a connecting cable prior to and after the charging process.

A wireless power charging system for a BEV may be further configured for safety and security concerns. For example, the BEV may be configured to be immobilized when the wireless power BEV or CB antennas are deployed, when such antennas cannot be retracted (e.g., due to damage or obstacle). Such immobilization may protect the wireless power charging system from further damage. The wireless power charging system may further include sensors that detect mechanical resistance of the wireless power BEV or CB antennas. Detecting mechanical resistance may protect the wireless power BEV or CB antennas and accompanying components from being damaged if an obstacle (stone, debris, snow, animal, etc.) is positioned in a location that would restrict the movement of the antenna.

The wireless power charging system may further include continuous monitoring of the wireless power link between the BEV antenna and CB antenna (e.g., monitoring voltages, currents, power flow, etc.) and reduce the power transmitted or shut down power in the event of detection of an abnormality in the wireless power link. The wireless power charging system may further include sensors configured to detect the presence of persons or animals in close proximity of the antenna. Such sensors may be desirable in order for a processor to reduce or terminate wireless power transmission if a person is proximate the wireless power antennas. Such an action may be a safety precaution against prolonged exposure to electromagnetic radiation, such as for example, while a person performs maintenance or other repair work underneath the BEV particularly for persons using cardiac pacemakers or similar sensitive and safety critical medical devices.

Wireless energy transmission principles are further described herein. As described above, wireless energy transfer uses capacitively loaded wire loops (or multi-turn coils) forming a resonant structure that can provide strong coupling, thus capable of efficient energy transfer from a primary structure (e.g., transmitter) to a secondary structure (e.g., receiver) via the magnetic near field if both primary and secondary are tuned to a common resonance frequency. Also as stated, the method may also be known as "magnetic coupled resonance" or "resonant induction."

To enable wireless high power transfer, a frequency in the range from 20-60 kHz is considered desirable because highly efficient power conversion can be achieved using state-of-the-art solid state devices and there may be less coexistence issues with radio systems compared to other bands. For calculations of power transfer, a BEV-mounted antenna coil that may be disk-shaped (as described above) and that can be moved horizontally (generally in x,y direction) for alignment purposes as well as vertically (z direction) is assumed. As described herein, the BEV antenna module may normally be stowed in vehicles underbody to be non-protrusive. When BEV is parked for charging, the antenna coil is lifted down in the z direction to minimize the distance to the CB antenna coil that may also be disk-shaped (as described above) as well as ground embedded.

Figure 15:
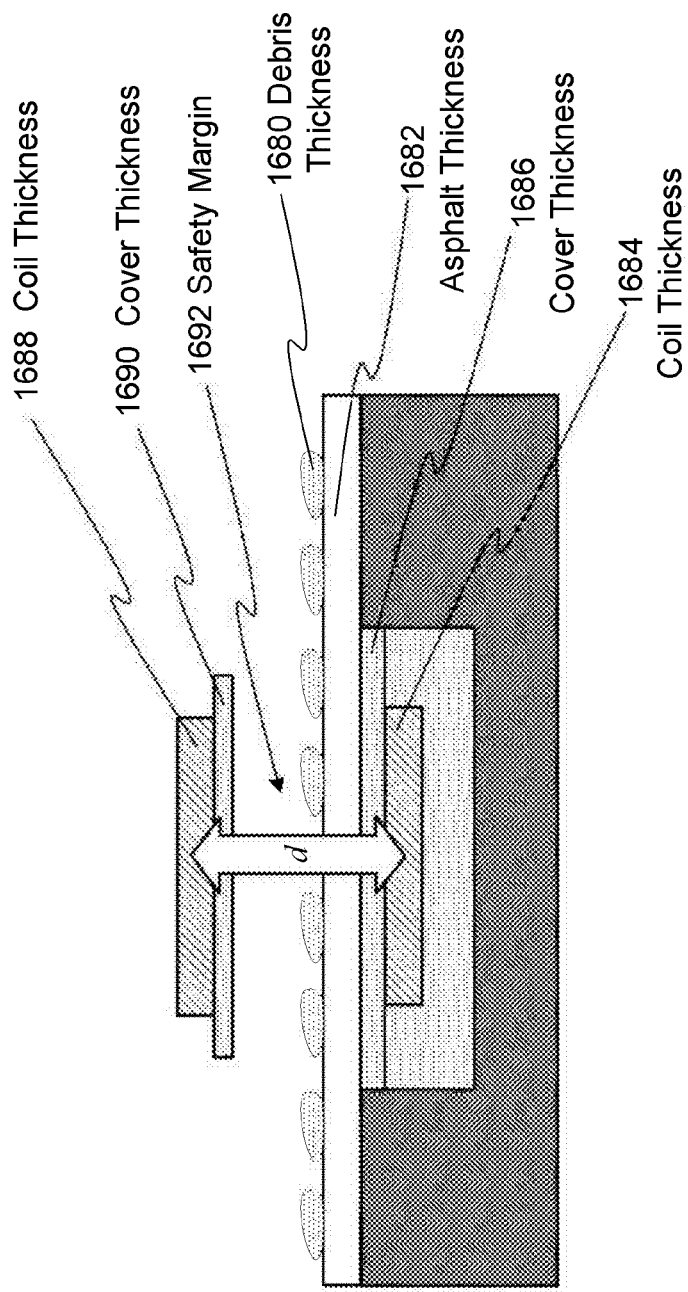
FIG. 15 illustrates distance constraints for energy transfer, according to an exemplary embodiment of the present invention.

FIG. 15 illustrates distance constraints for energy transfer, according to exemplary embodiments of the present invention. Minimum distance d enables energy transfer at maximum efficiency and maximum power under regulatory constraints. Zero distance (antennas touching) would be optimum. However in a practical solution that needs to be robust, flexible and reliable, a certain separation is expected. This irreducible distance will depend on several thickness factors such as (1) environmental (presence of dirt, debris, snow, mainly in an outdoor parking) illustrated as debris thickness 1680, (2) embedding of CB antenna coil in ground (below asphalt, flush, protrusive) illustrated as asphalt thickness 1682, (3) housing of CB and BEV antenna module illustrated as coil thickness 1684, cover thickness 1686 for the CB and coil thickness 1688 and cover thickness 1690 for the BEV, (4) safety margin thickness 1692 required to absorb sudden vertical displacements (shocks) of vehicles suspension system (e.g. if a heavy person sits down in a car while BEV antenna is deployed), etc., as illustrated in FIG. 15.

Ideally, the system adapts to the actual conditions with an objective to minimize the distance and thus maximizing the performance of the wireless power transfer. In such an exemplary adaptive system, separation of the CB and the BEV antenna coil may be variable requiring certain link parameters to be adapted accordingly if maximum power, maximum efficiency and regulatory compliance is to be addressed. This adaptation is further described herein below.

Figure 16:
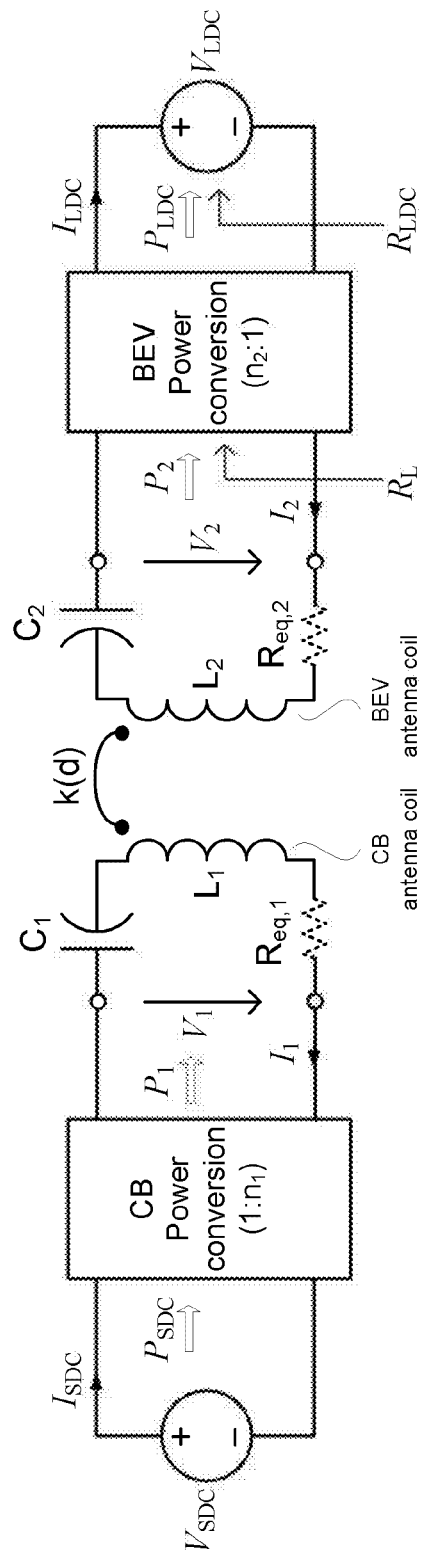
FIG. 16 is a circuit diagram for wireless power transfer system, in accordance with an exemplary embodiment of the present invention.

FIG. 16 illustrates a circuit diagram containing elements of a wireless power system, in accordance with an exemplary embodiment, based on a series resonant inductive link. Both a power source and a power sink (load) are assumed constant voltage with voltages $V_{SDC}$ and $V_{LDC}$ respectively, reflecting the characteristics of the power grid and the BEV battery, respectively. Constant voltage shall be understood in the sense of a virtually zero source resistance and zero sink resistance, respectively.

The circuit diagram of FIG. 16 as well as the following description assumes energy transfer from a CB-side source 1702 to a BEV-side sink 1704. However, this should not exclude energy transfer in reverse direction, for example, for purposes of vehicle-to-grid (V2G) energy transfer, provided that power conversion supports reverse power flow (bidirectional, four quadrant control).

Figure 17:
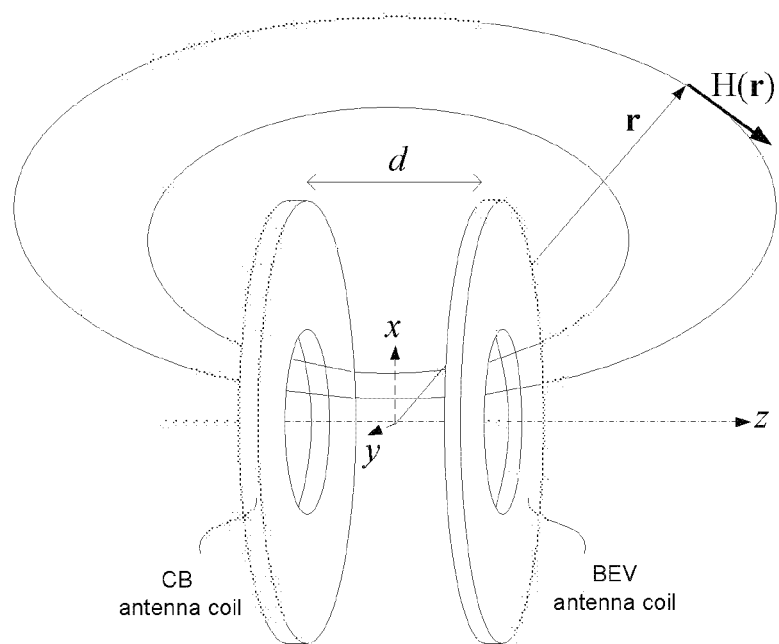
FIG. 17 illustrates transmit and receive loop antennas showing magnetic field strength relative to radius of the antennas.

FIG. 17 illustrates a CB antenna coil 1706 and a BEV antenna coil 1708 that are separated by distance d and are represented in FIG. 16 by their inductances $L_1$ and $L_2$, respectively and their mutual coupling coefficient k(d) that is a function of distance. Capacitors $C_1$ and $C_2$ are used to compensate for antenna inductance, thus to achieve resonance at desired frequency. Equivalent resistances $R_{eq,1}$ and $R_{eq,2}$ represent the losses inherent to the antenna coils and the anti-reactance capacitors.

FIG. 17 illustrates CB and BEV antenna coils that are separated by distance d and are represented in FIG. 16 by their inductances $L_1$ and $L_2$, respectively and their mutual coupling coefficient k(d) that is a function of distance. Capacitors $C_1$ and $C_2$ are used to compensate for antenna inductance, thus to achieve resonance at desired frequency. Equivalent resistances $R_{eq,1}$ and $R_{eq,2}$ represent the losses inherent to the antenna coils and the anti-reactance capacitors. FIG. 17 also indicates the magnetic field vector H(r) that is generated by the pair of coils at a position r in the vicinity of the wireless power system.

In the exemplary embodiment illustrated in FIG. 16, CB-side power conversion converts DC power into AC power at a desired frequency (operating frequency), preferably in the VLF or LF range, for example, from 20 kHz to 60 kHz for the high power application of concern. In the following, any frequency in this range is generally called LF.

In another embodiment however, CB-side power conversion may also convert AC power at a standard mains frequency into AC power at an operating frequency suitable for wireless power. In yet another exemplary embodiment, CB-side power conversion may convert unfiltered DC (e.g. AC-pulsed DC power) into AC power at an operating frequency. In these two latter embodiments, power generated at operating frequency may be non-constant envelope.

A transformation ratio $1:n_1$ can also be attributed to CB power conversion. and may be defined as $$1:n_1 = V_{SDC} : V_1 \qquad \text{Equation 1}$$

where $V_{SDC}$ and $V_1$ denote the DC input voltage and the r.m.s. voltage of the fundamental frequency at LF output, respectively.

BEV-side power conversion performs reverse operation reconverting LF power received by BEV antenna back to DC power. Correspondingly, a transformation ratio $n_2:1$ is attributed to CB power conversion, which may be defined as $$n_2:1 = V_2 : V_{LDC} \qquad \text{Equation 2}$$

where $V_2$ and $V_{LDC}$ denote the r.m.s. voltage of the fundamental frequency at LF input and the DC output voltage, respectively.

Theory shows that efficiency and power of an inductively coupled resonant link reach a maximum, if resonance of both CB and BEV antenna are adjusted to the operating frequency. This is valid for any coupling coefficient $0 < k(d) < 1$. In practice, power conversion may require the system to be operated slightly off resonance, if zero current switching is targeted. This can be explained by phase offset of harmonics components contained in the antenna current. For example, the system may be operated within a first range of the resonance frequency. The first range may be, for example, a range within about +/−10 kHz, about +/−5 kHz, or about +/−1 kHz of the resonance frequency.

It also shows that for given parameters $L_1$, $L_2$, $n_1$ and $n_2$ there exists an optimum load resistance $R_{LDC,opt}$ that minimizes losses in power conversion and in the resonant inductive link thus maximizing end-to-end efficiency. End-to-end efficiency may be defined as $$\eta_{e2e} = \frac{P_{LDC}}{P_{SDC}} \quad \text{Equation 3}$$

where $P_{LDC}=V_{LDC}\cdot I_{LDC}$ and $P_{SDC}=V_{SDC}\cdot I_{SDC}$ denote the DC load (output) power and the DC source (input) power. Conversely, given load resistance and transformation ratios $n_1$ and $n_2$, there exists an optimum pair of inductance $L_{1,opt}$ and $L_{2,opt}$ or alternatively, given $L_1$ and $L_2$, an optimum pair of ratio $n_{1,opt}$ and $n_{2,opt}$ maximizing efficiency $\eta_{e2e}$.

In the following for the sake of efficiency of the mathematical equations but without loss of generality, it is assumed that the wireless power system is fully symmetric, meaning that $$V_{DC}=V_{SDC}=V_{LDC} \quad \text{Equation 4}$$

$$n=n_1=n_2 \quad \text{Equation 5}$$

$$L=L_1=L_2 \quad \text{Equation 6}$$

$$R_{eq}=R_{eq,1}=R_{eq,2} \quad \text{Equation 7}$$

It can be shown that conclusions drawn from this specific case can also be applied to the general case of an asymmetric system.

Furthermore, it is assumed that both CB and BEV power conversion are lossless and that instead power conversion losses are accounted for in the equivalent loss resistances $R_{eq,1}$ and $R_{eq,2}$, respectively. Evidently, the efficiency of the resonant inductive link that can be defined as the ratio of output power-to-input power $$\eta = \frac{P_2}{P_1} \quad \text{Equation 8}$$

equals to the end-to-end efficiency $\eta_{e2e}$ as defined above.

Assuming switched-mode power conversion with a 50% duty cycle, voltage $V_1$ and $V_2$ are both square waves. Though filtered by the effect of resonance, antenna currents $I_1$ and $I_2$ are generally non-sinusoidal with harmonics content depending on coupling coefficient. Thus some power is transmitted via harmonics. In most cases however, energy transfer via harmonics is negligible. For the purpose of illustration, currents are assumed substantially sinusoidal such that CB antenna input power and BEV antenna output power can be defined as $$P_1 \cong \frac{V_{1,0}}{I_{1,0}} \quad \text{Equation 9}$$

$$P_2 \cong \frac{V_{2,0}}{I_{2,0}} \quad \text{Equation 10}$$

with voltages and currents referring to the r.m.s. of the fundamental component at LF. For system dimensioning, it can be shown that there exist basically two equations.

The first equation yields an optimum antenna coil inductance $$L_{opt} \cong \frac{R_{L,0}}{\omega_0 k(d)} \quad \text{Equation 11}$$

maximizing $\eta$, given coupling coefficient $k(d)$, and angular operating frequency $\omega_0$, and load resistance $$R_{L,0} = \frac{V_{2,0}}{I_{2,0}} \quad \text{Equation 12}$$

as presented by BEV power conversion at fundamental frequency.

The mathematical derivation of Equation 11 is further described hereinbelow. Equation 11 is valid in a strongly coupled regime where $L_{opt}$ is practically independent of the actual loss resistance $R_{eq}$. However, it will depend on the load resistance and the coupling coefficient, which generally need to be adapted if load resistance and/or separation of CB and BEV antenna are changed.

A second equation relates energy transfer rate $P_2$ and coupling coefficient $k(d)$ to the generated magnetic field $$H^2(r) \cong \frac{c(g_1, g_2, r)}{\omega_0} \frac{P_2}{k(d)} \quad \text{Equation 13}$$

Here c shall denote a factor that takes into account the CB and BEV antennas geometry $g_1$ and $g_2$, and the position the magnetic field strength refers to, defined by the position vector r as illustrated in FIG. 17 and the mathematical derivation is further described hereinbelow. Equation 13 assumes that position r is enough distant to antenna coils so that a change of their separation in the range of interest excerpts virtually no influence on the magnetic field at reference position, except the effect of their mutual coupling.

Introducing a regulatory constraint, e.g. magnetic field strength $H(r_m)$ measured at a position $r_m$ in defined distance shall not exceed a defined limit $H_{lim}$, provides a limit for the energy transfer rate $$P_{2,max} \cong \frac{\omega_0}{c(g_1, g_2, r_m)} k(d) H_{lim}^2 \quad \text{Equation 14}$$

Equation 14 demonstrates that maximum energy transfer rate decreases proportionally to the coupling coefficient. For example, assuming a maximum power of 4 kW at a coupling coefficient of 0.4, power is limited to 2 kW if antenna separation is increased so that a coupling coefficient of 0.2 results.

Now using the definitions of the voltage and current transformation ratio as applicable to the fundamental component $$n_0 : 1 = V_{2,0} : V_{LDC} = I_{DCL} : I_{2,0}, \quad \text{Equation 15}$$

the corresponding load resistance $$R_{L,0} = \frac{n_0 V_{LDC}}{\left(\frac{1}{n_0}\right) I_{LDC}} = n_0^2 R_{LDC} = n_0^2 \frac{V_{LDC}^2}{P_{LDC}}, \quad \text{Equation 16}$$

in terms of DC load voltage $V_{LDC}$ and DC load power $P_{LDC}$, and the assumption of a lossless power conversion $P_2=P_{LDC}$ Equation 11 may be written $$L_{opt} \cong \frac{R_{L,0}}{\omega_0 k(d)} = \frac{n_0^2 R_{LDC}}{\omega_0 k(d)} = \frac{n_0^2 V_{LDC}^2}{\omega_0 k(d) P_2} \quad \text{Equation 17}$$

Substituting $P_2$ by Equation 14 provides a relation between $L_{opt}$, k(d), and $n_0$ $$L_{opt} \cong \frac{c(g_1, g_2, r_m)}{\omega_0} \cdot \frac{n_0^2}{k^2(d)} \cdot \frac{V_{LDC}^2}{H_{lim}^2(r_m)} \quad \text{Equation 18}$$

To satisfy Equation 18 that ensures maximum efficiency and regulatory compliance, either antenna inductance $L=L_1=L_2$, or transformation ratio $n=n_1=n_2$, or both have to be adapted when distance is changed. If ever possible, varying antenna inductance should be avoided as in general it will involve complex switching circuitry or mechanical gear, additional losses and non-optimum use of antenna volume thus loss of quality factor. It also requires variable capacitance to maintain resonance, thus adding to complexity. The use of an additional antenna matching network acting as a transformer may bring along similar drawbacks.

A less complex and more economical solution may be achieved by using power conversion to provide the required variable transformation ratio. Changing CB-side transformation ratio $n_1$ is equivalent to power control since it will largely affect energy transfer rate across the link. Changing BEV-side transformation ratio $n_2$ accordingly will ensure that the wireless power link is operated efficiently. it may be called load adaptation.

Several methods for power control and load adaptation have been proposed with some allowing for continuous change of transformation ratio, however sacrificing zero current switching (ZCS), thus leads to some increased switching loss and stress of switching devices. Others methods may maintain ZCS condition, but permit change of transformation ratio only in coarse steps.

One method to change transformation ratio and that is extremely low-loss, is to change the operational mode of the bridge (e.g., from full-bridge mode to half-bridge mode or vice versa). This method is further described hereinbelow.

Figure 18:
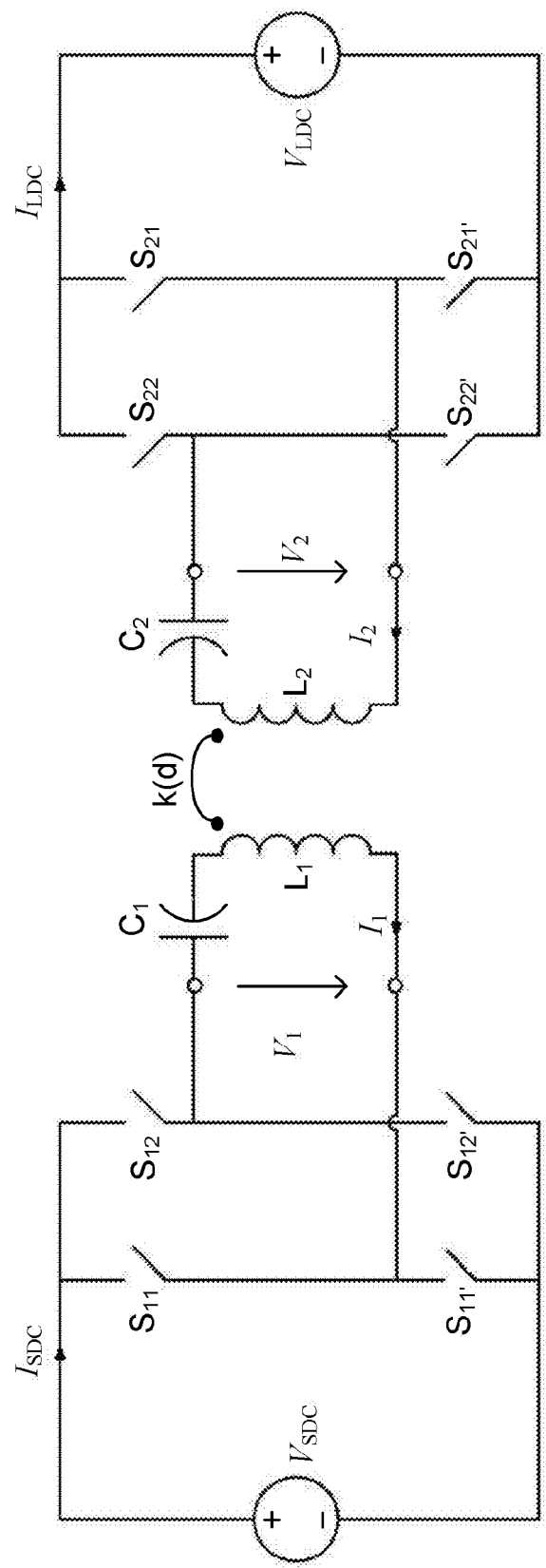
FIG. 18 illustrates an adaptable power conversion reconfigurable as a full-bridge power conversion and a half-bridge, in accordance with an exemplary embodiment of the present invention.

The basic circuit diagram of a full-bridge-based series resonant wireless energy transfer system is displayed in FIG. 18. CB-side switches $S_{1j}$ may represent FET or IGBT solid state devices, whilst switches of BEV-side LF-to-DC power conversion may be passive diodes but also active devices, in case of synchronous rectification.

In full or H-bridge mode, all switches of power conversion are toggling in a manner that $S_{j1}$ and $S_{j2'}$ are closed at the same time. When $S_{j1}$ is closed then $S_{j2}$ and $S_{j1'}$ are open and vice versa. This applies to CB-side and BEV-side power conversion ($j \in \{1,2\}$).

In half-bridge mode e.g. only $S_{11}$ and $S_{11'}$ are toggling and $S_{12'}$ and $S_{12}$ are static. When $S_{11}$ is closed then $S_{11'}$ is open and vice versa. In the static half-bridge e.g. $S_{12'}$ may be closed. The fact that current needs to pass switch $S_{12'}$ causes some extra losses, which would not exist in a non-adaptive half-bridge-based system. However this additional CB-side and BEV-side switch on-state resistance is considered a low price for a system that is capable efficient adaptation to two different transfer distances.

In case of a unidirectional energy transfer system using a passive diode full-bridge rectifier in BEV-side power conversion, one half-bridge needs to be supplemented with active switches (FETs or IGBTs) in parallel to the diodes. These transistors however need only be static switches.

It can be shown that a full-bridge transforms a DC voltage level into a LF voltage level of the fundamental by $$n_0 = \frac{\sqrt{8}}{\pi} \quad \text{Equation 19}$$

which is approximately 1.
Correspondingly, a half-bridge transforms by $$n_0 = \frac{\sqrt{2}}{\pi} \quad \text{Equation 20}$$

which is approximately ½.

Now a system that is capable to adjust BEV antenna to two discrete z-positions corresponding to a shorter distances d' and a longer distance d", respectively, is considered. If conditions permit, the system uses the shorter distance e.g. that corresponds to a coupling coefficient k(d'), else it adjusts to d" corresponding to k(d"). Distances are chosen such that $$k(d')=2 \cdot k(d'') \quad \text{Equation 21}$$

From Equation 18, Equation 19, Equation 20, and Equation 21, it becomes evident that an inductance $L_{opt}$ can be found that is optimum at both distances, if the system operates in full-bridge mode at distance d' and in half-bridge mode at distance d". This is proved by defining $$c' = \frac{c(g_1, g_2, r_m)}{\omega_0} \cdot \frac{V_{LDC}^2}{H_{lim}^2(r_m)} \quad \text{Equation 22}$$

and by expressing the optimum antenna inductance (Equation 18) as follows:

$$L_{opt} \cong c' \cdot \frac{8}{\pi^2 k^2(d')} \quad \text{Equation 23}$$
$$= c' \cdot \frac{2}{\pi^2 k^2(d'')}$$
$$= c' \cdot \frac{2}{\pi^2 k^2(d')/4}$$

An example of a system that is capable to optimally adapt to two different distances by changing mode of power conversion while attempting to maintain maximum efficiency and maximum power within regulatory constraints is shown in the table below.

TABLE 1

Example of a system that optimally adapts to two different distances

| Distance d | Coupling coefficient k(d) | Operating mode | Transformation ratio $n_0$ | Energy transfer rate $P_2$ [kW] |
|---|---|---|---|---|
| 4.8 cm | 0.4 | Full-bridge | $\frac{\sqrt{8}}{\pi}$ | 4 |

TABLE 1-continued

Example of a system that optimally adapts to two different distances

| Distance d | Coupling coefficient k(d) | Operating mode | Transformation ratio $n_0$ | Energy transfer rate $P_2$ [kW] |
|---|---|---|---|---|
| 10 cm | 0.2 | Half-bridge | $\frac{\sqrt{2}}{\pi}$ | 2 |

Of course, this method of bridge reconfiguration may be combined with other methods of power control/load adaptation in order to adapt the link to any distance within a predefined range and/or to throttle load power (battery charge current). Examples of alternative methods include (1) operating the link off-resonance by changing frequency, (2) intentional detuning of antennas, (3) using PWM drive waveforms with duty cycle <50%; (4) DC-to-DC converter in CB and BEV power conversion, (5) phase switching in case of 2-phase or 3-phase supply, etc. These methods may all be considered directly or indirectly changing transformation ratios $n_1$ and $n_2$.

In a practical system, transformation ratio and antenna z-axis position will be controlled by a control system (described above) with entities in the CB and BEV subsystem. These entities may communicate using in-band or out-of-band signaling.

Regarding the derivation of Equation 11, the optimum load resistance of a magnetically coupled resonant system may be derived by $$R_{L,opt} = R_2 \sqrt{1 + k^2 Q_1 Q_2} \qquad \text{Equation 24}$$

where $R_2$ denotes the loss resistance of the resonant receive antenna, $Q_1$ and $Q_2$ the Q-factors of the resonant transmit and receive antenna, respectively, and k the coupling coefficient. Loading the magnetic link with $R_{L,opt}$ maximizes transfer efficiency.

In a strongly coupled regime $$k^2 Q_1 Q_2 \gg 1 \qquad \text{Equation 25}$$

or in the so-called 'magic' regime where link efficiency is close to 100%, Equation 24 may be simplified to $$R_{L,opt} \approx R_2 \sqrt{k^2 Q_1 Q_2} \qquad \text{Equation 26}$$

In a high power wireless energy transfer system, the assumption of a strongly coupled regime or even a 'magic' regime will be mostly valid.

Now assuming a fully symmetric link with $$L = L_1 = L_2 \qquad \text{Equation 27}$$

$$R = R_1 = R_2 \qquad \text{Equation 28}$$

and substituting Q-factors $Q_1$ and $Q_2$ in Equation 26 by $$Q = Q_1 = Q_2 = \frac{\omega_0 L}{R} \qquad \text{Equation 29}$$

yields $$R_{L,opt} \approx k \omega_0 L \qquad \text{Equation 30}$$

Conversely, given the load resistance $R_L$, there exists an optimum antenna inductance $$L_{opt} \cong \frac{R_L}{k \omega_0} \qquad \text{Equation 31}$$

that maximizes efficiency.

Regarding the derivation of Equation 13, the magnetic field strength as produced at a location r by the BEV antenna that is in essence a multi-turn wire loop may be expressed as $$H_2(r) = N_2 \cdot I_{2,0} \cdot \gamma(g_2, r) \qquad \text{Equation 32}$$

where $N_2$ denotes number of turns of the antenna coil, $I_{2,0}$ the antenna current at fundamental, and $\gamma$ is basically a function of its geometry $g_2$ and position vector r where the field strength refers to. Equation 32 assumes that varying the number of turns would not change the antenna coils geometry, hence $g_2 \neq f(N_2)$.

The inductance of the multi-turn loop may be expressed as $$L_2 = N_2^2 \cdot \beta(g_2) \qquad \text{Equation 33}$$

where $\beta$ is basically a function of coil geometry $g_2$.

The load resistance may be expressed as a function of power $P_2$ and current $I_{2,0}$ as follows:

$$R_{L,0} \cong \frac{P_2}{I_{2,0}^2} \qquad \text{Equation 34}$$

Now using Equation 11 and substituting above equations yields $$N_2^2 \cdot \beta(g_2) \cong \frac{P_2}{\omega_0 k(d) \cdot I_{2,0}^2} \qquad \text{Equation 35}$$

and with some manipulations also using Equation 32, we obtain for the square of the magnetic field strength at position r $$N_2^2 \cdot I_{2,0}^2 \cdot \beta(g_2) = H_2^2(r) \frac{\beta(g_2)}{\gamma^2(g_2, r)} \cong \frac{P_2}{\omega_0 k(d)}. \qquad \text{Equation 36}$$

Defining $$c(g, r) = \frac{\gamma^2(g_2, r)}{\beta(g_2)} \qquad \text{Equation 37}$$

yields $$H_2^2(r) \cong \frac{c(g_2, r)}{\omega_0} \frac{P_2}{k(d)} \qquad \text{Equation 38}$$

So far CB antennas contribution to the magnetic field which is according to Equation 32

$$H_1(r) = N_1 \cdot I_{1,0} \cdot \gamma(g_1, r) \qquad \text{Equation 39}$$

has been neglected.

In the symmetric case, number of turns $N_1$ equals $N_2$ and current $I_{1,0}$ of CB antenna will change proportionally to $I_{2,0}$. Hence contributions from CB and BEV antenna $H_1(r)$ and $H_2(r)$ at location r will also change proportionally, because $$\frac{P_2}{P_1} = \frac{V_{2,0} I_{2,0}}{V_{1,0} I_{1,0}} = \frac{I_{2,0}}{I_{1,0}} = \eta \qquad \text{Equation 40}$$

given that $V_{SDC} = V_{LDC}$ hence $V_{1,0} = V_{2,0}$.

It can be easily shown that proportions would also remain in the asymmetric case ($N_1 \neq N_2$) if $N_2$ was changed in a process of optimization. Defining $c(g_1,g_2,r)$ that takes into account geometry of both antennas as well as the phase offset of $I_{1,0}$ relative to $I_{2,0}$, which in case of resonance is always 90 degrees independent of the mutual coupling, the sum field may be expressed as $$H^2(r) \cong \frac{c(g_1, g_2, r)}{\omega_0} \frac{P_2}{k(d)}, \quad \text{Equation 41}$$

which is Equation 13.

Figure 19A:
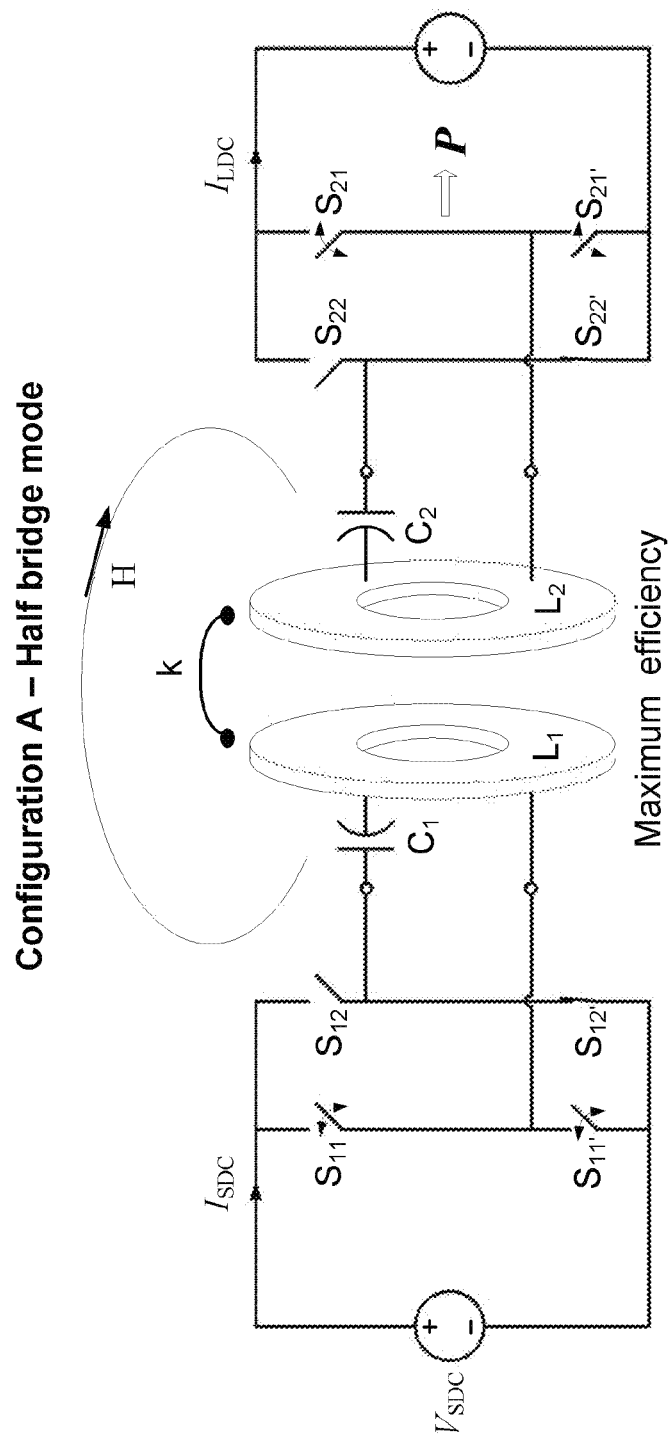
FIGS. 19A and 19B illustrate a half-bridge power conversion configuration and a Full-bridge power conversion configuration, in accordance with an exemplary embodiment of the present invention.
Figure 19B:
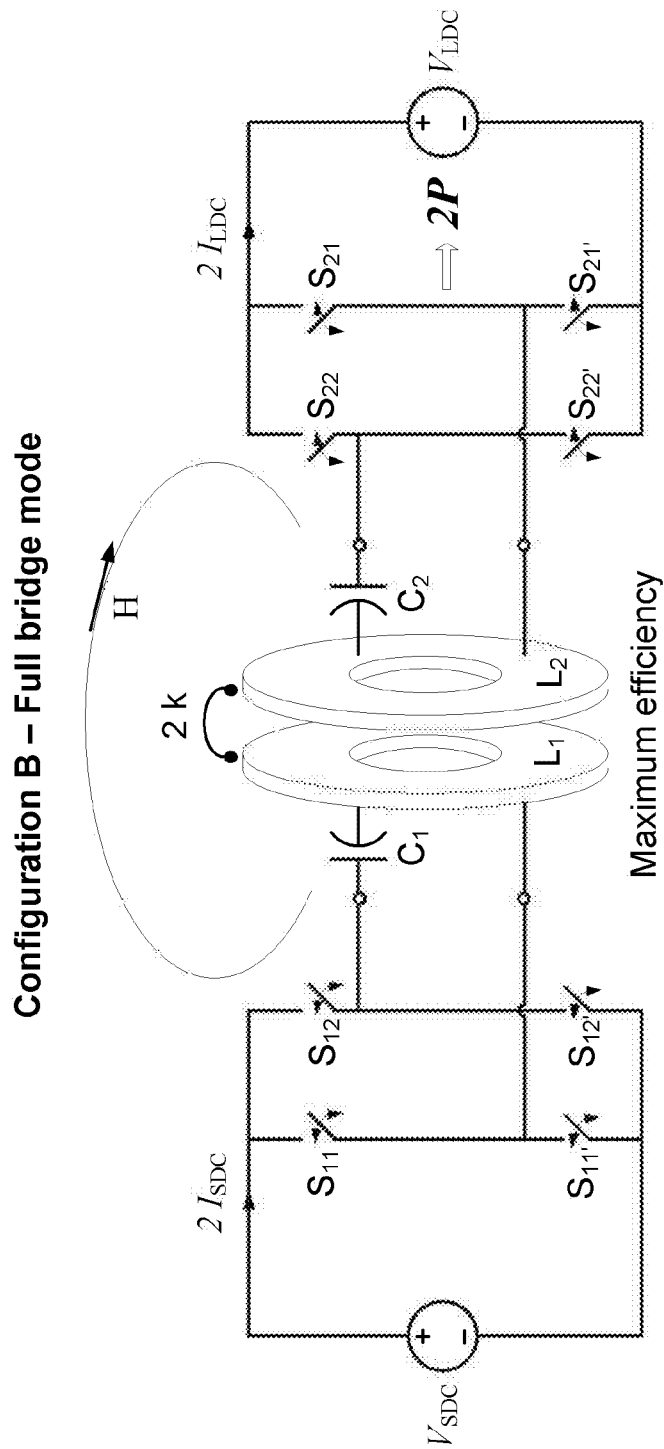

FIGS. 19A and 19B illustrate two circuit configurations of an adaptable series resonant energy transfer system, in accordance with an exemplary embodiment. In FIG. 19A, configuration A assumes (1) a longer distance or in general a looser coupling between transmit and receive antenna, (2) both transmit and receive side power conversion operate in half-bridge mode. In FIG. 19B, configuration B assumes (1) a shorter distance or in general a tighter coupling between transmit and receive antenna, (2) both transmit and receive side power conversion operate in full-bridge mode.

Both configurations assume a constant voltage source and a constant voltage sink. This assumption is useful but also very reasonable considering a system that transfers energy from the power grid to a vehicles battery (G2V) or vice versa (V2G). This analysis of the wireless power link reveals:
1) Energy transfer rate (power P) doubles with configuration B without the need for adapting
   Supply voltage and sink voltage
   Reactance of resonant antennas (inductances and capacitances)
both implemented without additional circuitry and/or mechanics for power/voltage conversion and/or variable reactance.
2) Both configurations are optimally matched to achieve maximum energy transfer efficiency.
3) Both configurations are equivalent in terms of magnetic field strength as measured in the antennas vicinity, thus potential to fully exploiting a regulatory/EMC constraint.

A constant voltage sink (battery) is assumed as opposed to a constant load resistance. Summarizing, an adaptive system and a method to transfer energy from a voltage source to a voltage sink either over a longer distance (looser coupling) with a lower power or over a shorter distance (tighter coupling) with a higher power is disclosed, where the system is adaptable to operate at maximum efficiency, also optimally exploiting a regulatory limit, solely by changing mode of operation of transmit and receive side power conversion to either half-bridge mode or full-bridge mode, respectively.

Figure 20:
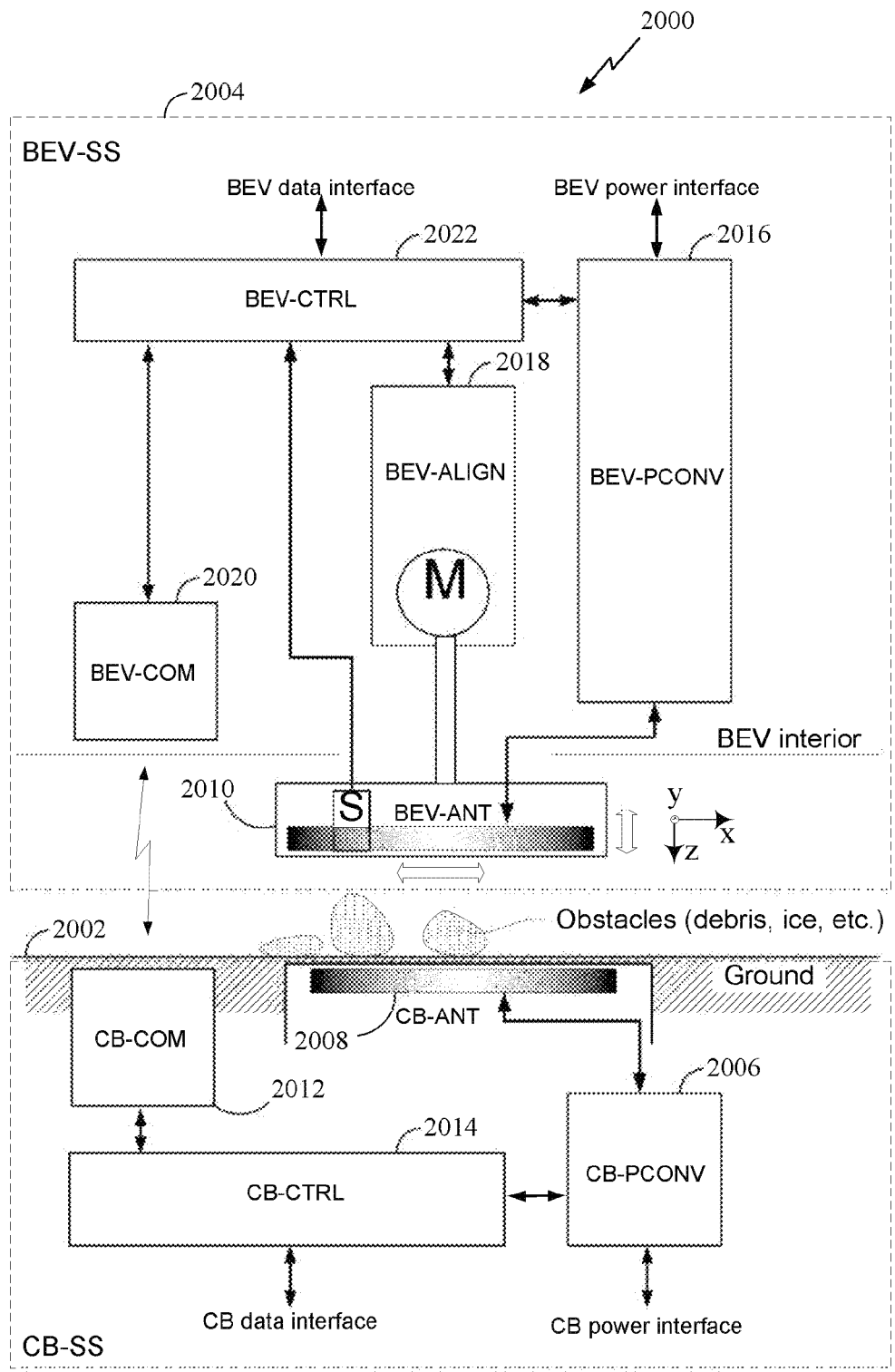
FIG. 20 illustrates wireless power transfer components for a wireless power transfer system, in accordance with an exemplary embodiment of the present invention.

FIG. 20 illustrates wireless power transfer components for a wireless power transfer system, in accordance with an exemplary embodiment of the present invention. Regarding sensing, communication and control, a wireless power system that adapts to the actual conditions while aiming at a maximum performance and efficiency of the wireless power link makes use of ancillary functions for sensing, communication, and control. These ancillary functions may be part of the BEV wireless charging system 2000 whose generic architecture is displayed in FIG. 20.

The system 2000 can be subdivided into two major subsystems: the Charging Base subsystem (CB-SS) 2002 and the Battery Electric Vehicle subsystem (BEV-SS) 2004. The CB subsystem 2002 is comprised of (1) CB power conversion (CB-PCONV) 2006 that converts DC power or AC power at supply frequency into transmit power at operating frequency (e.g. LF) or vice versa in reverse mode of operation (V2G). it integrates several sensors to measure voltages and currents as shown in a simplified circuit diagram of FIG. 21.
(2) CB antenna module (CB-ANT) 2008 that contains CB antenna coil and that can transmit or receive 'wireless' power to/from the BEV antenna 2010. CB antenna coil is assumed fixed and ground-embedded.
(3) CB communication transceiver (CB-COM) 2012 that communicates with the BEV to exchange system control data but also data to identify or authenticate the BEV or data that is generated by other applications directly or indirectly related to BEV charging. CB-COM 2012 may use a dedicated antenna or may make reuse of CB-ANT 2008.
(4) CB control unit (CB-CTRL) 2014 that processes data received from the BEV and the various sensors of the CB subsystem 2002 and controls the different entities of the CB subsystem 2002.

Figure 21:
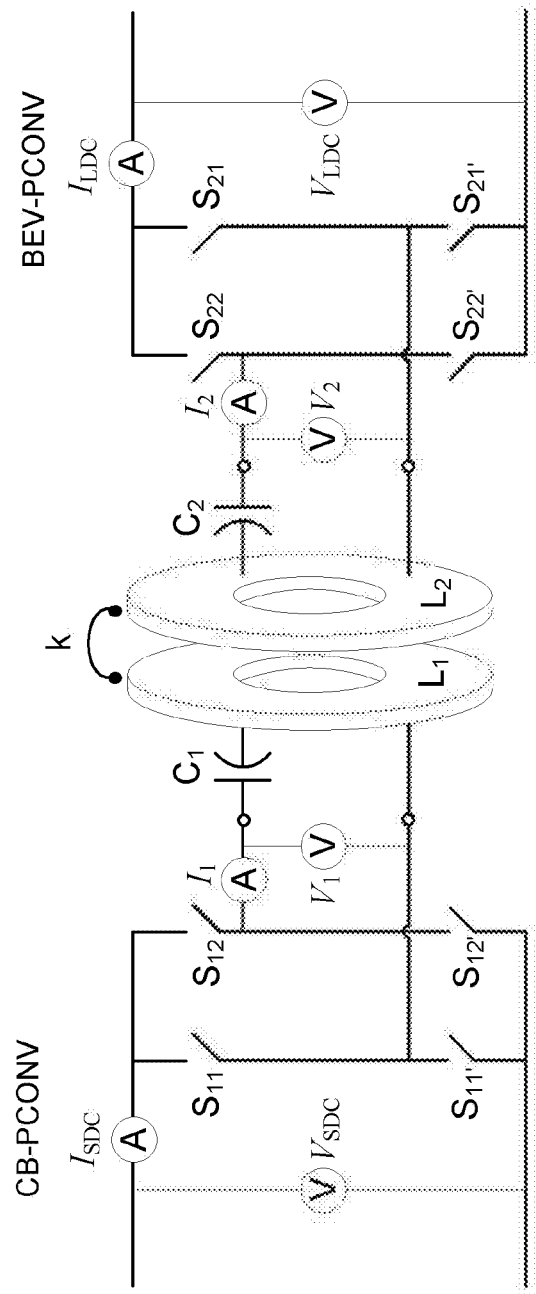
FIG. 21 illustrates various sensors for gathering measurements, in accordance with an exemplary embodiment of the present invention.

The BEV subsystem 2004 is comprised of
(1) BEV power conversion (BEV-PCONV) 2016 that converts 'wireless' power received at operating frequency (e.g. LF) into DC power or AC power at supply frequency or vice versa in reverse mode of operation (V2G). BEV-PCONV integrates several sensors to measure voltages and currents as shown in FIG. 21.
(2) BEV antenna module (BEV-ANT) 2010 that contains the BEV antenna coil and that can receive or transmit 'wireless' power from/to the BEV antenna 2010. BEV antenna coil is assumed movable in X, Y, Z-direction. BEV-ANT 2010 also integrates at least one sensor (S) to detect unwanted objects like stones, debris, snow, ice, etc. that may constrain degree of freedom of BEV antenna e.g. to move to a low enough z-position. Sensors may include at least one of a mechanical resistance sensor integrated in antennas mechanics, a tactile sensor at antenna modules surface, an ultrasonic sensor, an optical sensor, and an electromagnetic sensor to detect metallic objects.
(3) BEV-ALIGN 2018 that encompasses all the functionality to properly align the BEV antenna coil to the CB antenna coil and to adjust distance for a desired coupling. This entity includes an actuator that may be a servo-motor (M) driving BEV antenna mechanics. BEV-ALIGN 2018 may also integrate sensors to detect mechanical resistance.
(4) BEV communication transceiver (BEV-COM) 2020 that communicates with the CB to exchange system control data but also data to identify or authenticate the BEV or data that is generated by other application directly or indirectly related to BEV charging. BEV-COM 2020 may use a dedicated antenna or may make reuse of BEV-ANT 2010.
(5) BEV control unit (BEV-CTRL) 2022 that processes data received from the CB and the various sensors of the BEV subsystem 2004 and controls the different entities of the BEV subsystem 2004.

In the following, a procedure is described how this system may adapt to local conditions to maximize energy transfer rate and efficiency.

Transmit power may have to be reduced while the system adjusts to a new distance/coupling coefficient. There exist several methods of transmit power control that may apply to throttle power for link adjustment purposes. Since power can be significantly reduced, efficiency is less of an issue in this mode of operation.

If conditions permit and higher power (e.g. 4 kW) is desired, the system adjusts to a defined coupling k' at distance d'. Else, if conditions do not permit because objects on ground are detected by at least one of sensors (S) or if lower power (e.g. 2 kW) is desired, the system adjusts to a weaker but defined coupling k"=k/2 at larger distance d".

Since the relationship between coupling coefficient and distance may differ to some degree, depending on local conditions, it may be desirable to measure coupling coefficient k(d) rather than relying on distance.

BEV-CTRL can determine coupling coefficient k(d) by using measurement data from voltage and current sensors of BEV power conversion and CB power conversion that is transmitted from CB-CTRL to BEV-CTRL via the communication link. Knowing link parameters ($L_1$, $C_1$, $R_1$, $L_2$, $C_2$, $R_2$) and operating frequency as well as parameters of power conversion, coupling coefficient k(d) can be computed sufficiently accurate e.g. from the system of equations of the resonant inductive link $$V_1 - R_1 I_1 - j\left(\omega L_1 - \frac{1}{\omega C_1}\right) I_1 - j\omega M I_2 = 0 \qquad \text{Equation 42}$$

$$V_2 - R_1 I_2 - j\left(\omega L_2 - \frac{1}{\omega C_2}\right) I_2 - j\omega M I_2 = 0$$

Once BEV antenna is properly adjusted to one of the two target coupling coefficients (k' or k"), CB-PCONV and BEV-PCONV are configured to full-bridge mode (in case of k') or half-bridge mode (in case of k") and power is ramped up to maximum power that is permissible at this target coupling coefficients (e.g. 4 kW or 2 kW, respectively).

A more generic approach to adapting the system to any coupling coefficient may define a threshold for the coupling coefficient. If measured coupling coefficient is above that threshold, power conversion is configured to full-bridge mode. Conversely, if coupling coefficient is equal or below that threshold, power conversion is configured to half-bridge mode. This threshold may be defined somewhere halfway between the two target coupling coefficients e.g. at a value where both full-bridge mode and half-bridge mode would perform equally well (e.g. equal efficiency). However, operating the system at a coupling coefficient considerably deviating from the two target coupling coefficients may require additional means to control power, efficiency, and emission levels as described above.

Operation at defined coupling coefficients k' and k" in either full-bridge or half-bridge mode, respectively, as the basic mode of operation provides optimum energy transfer at maximum efficiency with lowest complexity in power conversion. Fine control to precisely adjust power to nominal power can be achieved by lowering or increasing coupling slightly or by another method that does not noticeably degrade efficiency.

Figure 22:
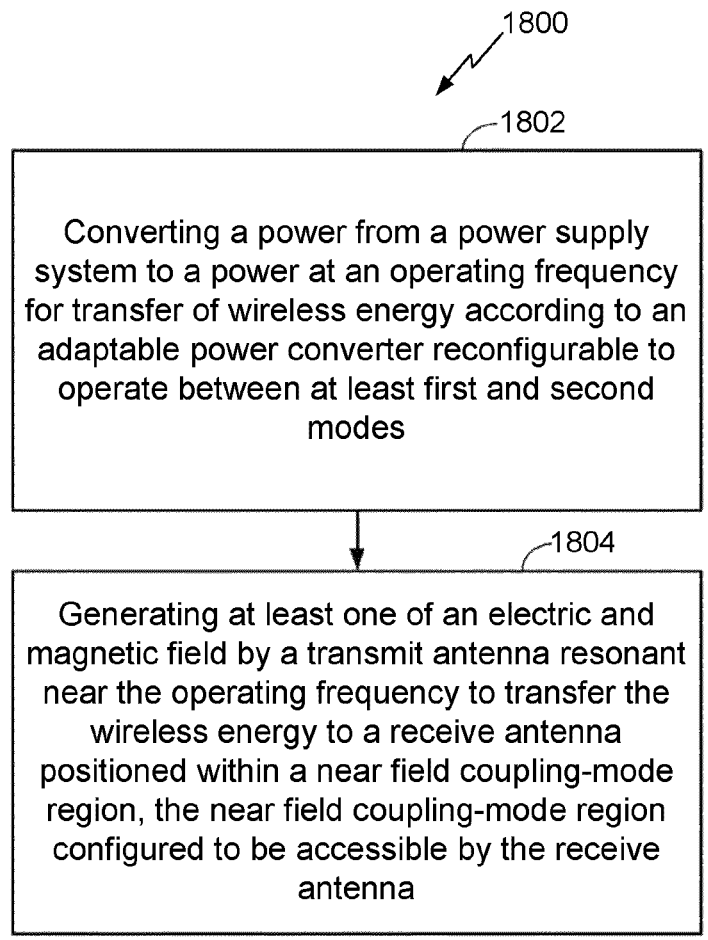
FIG. 22 is a flowchart of a method for adaptive power conversion, in accordance with an exemplary embodiment of the present invention.

FIG. 22 is a flowchart of a method for adaptive power conversion, in accordance with an exemplary embodiment of the present invention. A method 1800 includes a step 1802 for converting a power from a power supply system to a power at an operating frequency for transfer of wireless energy according to an adaptable power converter reconfigurable to operate between at least first and second modes. The method 1800 further includes a step 1804 for generating at least one of an electric and magnetic field by a transmit antenna resonant near the operating frequency to transfer the wireless energy to a receive antenna positioned within a near field coupling-mode region, the near field coupling-mode region configured to be accessible by the receive antenna.

Exemplary embodiments are directed to wireless power transfer using magnetic resonance in a coupling mode region between a charging base (CB) and a remote system such as a battery electric vehicle (BEV). The wireless power transfer can occur from the CB to the remote system and from the remote system to the CB. Load adaptation and power control methods can be employed to adjust the amount of power transferred over the wireless power link, while maintaining transfer efficiency.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus for wirelessly transmitting power, the apparatus comprising:
   a power conversion circuit configured to convert power received from a power supply in each of a first mode and a second mode of operation, the first mode of operation based on a first non-zero coupling coefficient, and the second mode of operation based on a second non-zero coupling coefficient;
   a first power transfer component electrically coupled to the power conversion circuit, the first power transfer component configured to wirelessly transfer charging power to a second power transfer component at a receiver based at least in part on the converted power; and
   a controller configured to reconfigure the power conversion circuit between at least the first and second modes based at least in part on a value indicative of a coupling coefficient between the first and second power transfer components, while the first power transfer component is wirelessly coupled to the second power transfer component.

2. The apparatus of claim 1, wherein the first mode corresponds to a full-bridge mode and the second mode corresponds to a half-bridge mode.

3. The apparatus of claim 2, wherein the controller is configured to reconfigure the power conversion circuit to operate in the first mode in response to detecting the indicative value is greater than a threshold.

4. The apparatus of claim 2, wherein the controller is configured to reconfigure the power conversion circuit to operate in the second mode in response to detecting the indicative value is less than a threshold.

5. The apparatus of claim 1, further comprising a switching circuit configured to phase-switch the power conversion circuit when the power received from the power supply comprises 2 or more phases.

6. The apparatus of claim 1, further comprising a pulse-width modulation circuit electrically coupled to the power conversion circuit, the pulse-width modulation circuit configured to operate with a duty cycle of less than 50%.

7. The apparatus of claim 1, further comprising a sensor configured to detect at least one object between the first and second power transfer components, wherein the first power transfer component is configured to move in an x, or y, or z-direction based at least in part on the at least one detected object.

8. The apparatus of claim 7, wherein the sensor comprises at least one of a mechanical resistance sensor, or a tactile sensor, or an ultrasonic sensor, or an optical sensor, or an electromagnetic sensor, or any combination thereof.

9. The apparatus of claim 1, wherein the first power transfer component is further configured to move between two discrete z-positions corresponding to a shorter distance and a longer distance between the first and second power transfer components, and wherein the power conversion circuit is further configured to operate in the first mode when the second power transfer component is located at the shorter distance and the second mode when the second power transfer component is at the longer distance.

10. The apparatus of claim 1, wherein the controller is configured to reconfigure the power conversion circuit between at least the first and second modes based at least in part on a distance between the first and second power transfer components.

11. The apparatus of claim 1, wherein the power conversion circuit is further configured to convert the received power to an alternating current at a wireless power transfer operating frequency.

12. The apparatus of claim 1, further comprising a resonant circuit comprising the first power transfer component, wherein the resonant circuit is configured to be substantially resonant at an operating frequency.

13. The apparatus of claim 12, wherein the controller is configured to at least one of cause the resonant circuit to operate off-resonance or partially detune the resonant circuit based at least in part on the value indicative of the coupling coefficient.

14. A method of wirelessly transmitting power, comprising:
   converting power received from a power supply by a power conversion circuit;
   operating the power conversion circuit such that the power conversion circuit is able to convert power in each of a first mode and a second mode, the first mode of operation based on a first non-zero coefficient, and the second mode of operation based on a second non-zero coupling coefficient;

wirelessly transferring charging power from a first power transfer component to a second power transfer component of a receiver based at least in part on the converted power; and reconfiguring the power conversion circuit between the first and second modes based at least in part on a value indicative of a coupling coefficient between the first and second power transfer components, while the first power transfer component is wirelessly coupled to the second power transfer component.

15. The method of claim 14, wherein the first mode corresponds to a full-bridge mode and the second mode corresponds to a half-bridge mode.

16. The method of claim 15, wherein reconfiguring the power conversion circuit between the first and second modes comprises reconfiguring the power conversion circuit to operate in the first mode when the indicative value is greater than a threshold.

17. The method of claim 15, wherein reconfiguring the power conversion circuit between the first and second modes comprises reconfiguring the power conversion circuit to operate in the first mode when the indicative value is less than a threshold.

18. The method of claim 14, further comprising:
detecting at least one object between the first and second power transfer components; and
moving the first power transfer component in at least one of an x, or y, or z-direction based at least in part on the at least one detected object to increase coupling between the first and second power transfer components.

19. An apparatus for wirelessly transmitting power, the apparatus comprising:
means for converting power received from a power supply in each of a first mode and a second mode of operation, the first mode of operation based on a first non-zero coupling coefficient, and the second mode of operation based on a second non-zero coupling coefficient;
means for wirelessly transferring charging power to a power transfer component based at least in part on the converted power; and
means for reconfiguring the converting means between the first and second modes based at least in part on a value indicative of a coupling coefficient between the transferring means and the power transfer component, while the transferring means is wirelessly coupled to the second power transfer component.

* * * * *